(12) United States Patent
Jang

(10) Patent No.: US 12,456,395 B2
(45) Date of Patent: Oct. 28, 2025

(54) FLEXIBLE DISPLAY DEVICE AND METHOD FOR CONTROLLING THE SAME

(71) Applicant: HYUNDAI MOBIS CO., LTD., Seoul (KR)

(72) Inventor: Kil Pyung Jang, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/342,008

(22) Filed: Jun. 27, 2023

(65) Prior Publication Data

US 2024/0059228 A1   Feb. 22, 2024

(30) Foreign Application Priority Data

Aug. 19, 2022   (KR) .................. 10-2022- 0103871

(51) Int. Cl.
| | | |
|---|---|---|
| *G09F 9/30* | (2006.01) | |
| *B60K 35/00* | (2024.01) | |
| *B60K 35/22* | (2024.01) | |
| *B60K 35/53* | (2024.01) | |
| *B60R 11/00* | (2006.01) | |
| *B60R 11/02* | (2006.01) | |

(52) U.S. Cl.
CPC ............. *G09F 9/301* (2013.01); *B60K 35/00* (2013.01); *B60R 11/0235* (2013.01); *B60K 35/22* (2024.01); *B60K 35/223* (2024.01); *B60K 35/53* (2024.01); *B60R 2011/0082* (2013.01); *B60R 2011/0092* (2013.01); *B60R 2011/0094* (2013.01)

(58) Field of Classification Search
None
See application file for complete search history.

(56) References Cited

U.S. PATENT DOCUMENTS

| | | | |
|---|---|---|---|
| 2016/0299531 A1 | 10/2016 | Vertegaal | |
| 2018/0070467 A1* | 3/2018 | Kim | ........................ H10K 50/84 |
| 2018/0160554 A1 | 6/2018 | Kang et al. | |
| 2019/0029131 A1* | 1/2019 | Han | ........................ H05K 5/0017 |
| 2019/0138058 A1* | 5/2019 | Kwon | ........................ G09G 3/22 |
| 2021/0124400 A1 | 4/2021 | Pyo | |
| 2021/0204427 A1 | 7/2021 | Pyo | |
| 2021/0213831 A1 | 7/2021 | Kang et al. | |
| 2021/0368637 A1* | 11/2021 | Suga | ........................ H05K 5/0017 |

(Continued)

FOREIGN PATENT DOCUMENTS

| | | | | |
|---|---|---|---|---|
| CN | 107452282 B | * | 5/2020 | ....... G02F 1/133305 |
| DE | 10115050 A1 | | 10/2002 | |

(Continued)

OTHER PUBLICATIONS

English Machine Translation of KR 20220096227 A (Year: 2022).*

(Continued)

*Primary Examiner* — Mohammed Jebari
(74) *Attorney, Agent, or Firm* — Novo TechIP International PLLC

(57) ABSTRACT

Disclosed is a flexible display device for a vehicle, including a casing with an opening defined therein, a display unit capable of being retracted into and extended out of the casing via the opening, a display driver for moving the display unit, and a display winder for winding the display unit thereon based on the movement of the display unit.

15 Claims, 27 Drawing Sheets

(a)

(b)

(56) References Cited

U.S. PATENT DOCUMENTS

| | | | |
|---|---|---|---|
| 2022/0001745 A1 | 1/2022 | Wall | |
| 2022/0076596 A1* | 3/2022 | Song | G06F 1/1656 |
| 2022/0210935 A1* | 6/2022 | Lee | G06F 1/1601 |
| 2022/0262281 A1 | 8/2022 | Kim et al. | |
| 2023/0131157 A1* | 4/2023 | Onogi | G06F 1/1652 |
| | | | 345/156 |

FOREIGN PATENT DOCUMENTS

| | | | |
|---|---|---|---|
| KR | 10-0821925 B1 | | 4/2008 |
| KR | 10-2016-0041671 A | | 4/2016 |
| KR | 10-2021-0086399 A | | 7/2021 |
| KR | 10-2328176 B1 | | 11/2021 |
| KR | 20220096227 A | * | 7/2022 |

OTHER PUBLICATIONS

Extended European Search Report issued Jan. 24, 2024, for European Patent Application No. 23180215.8 (9 pages).
Office Action issued in corresponding Korean Patent Application. No. 10-2022-0103871 dated Sep. 19, 2024.

\* cited by examiner

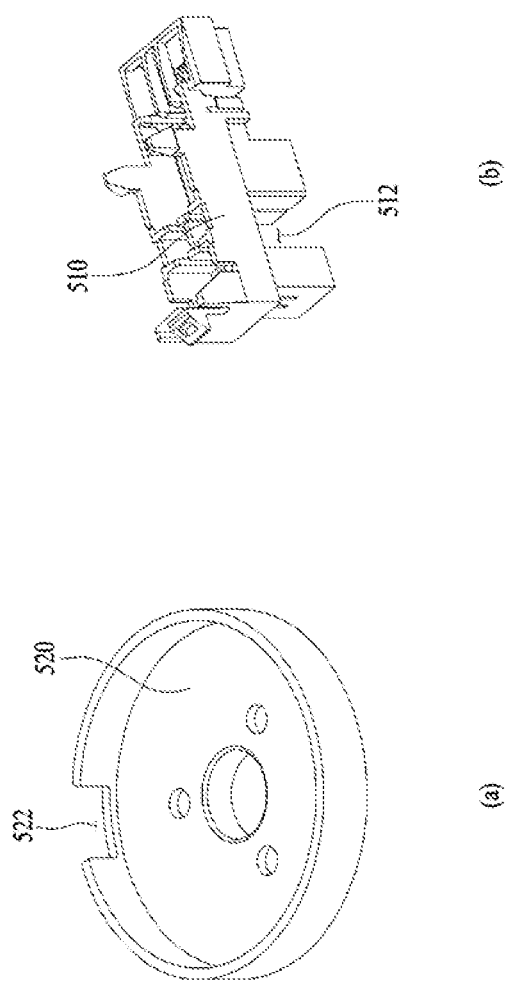

FIG. 11A
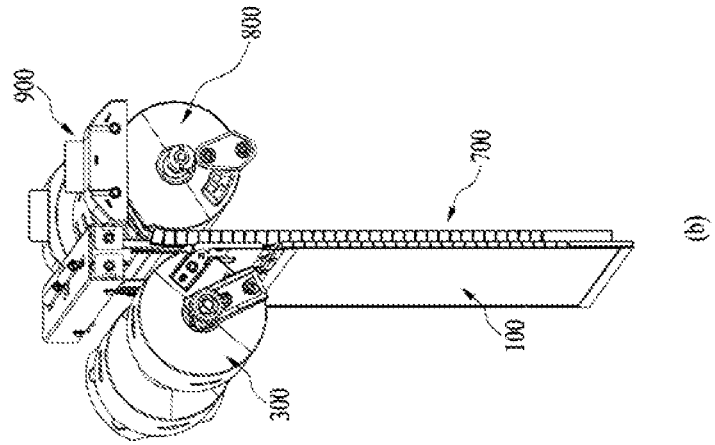
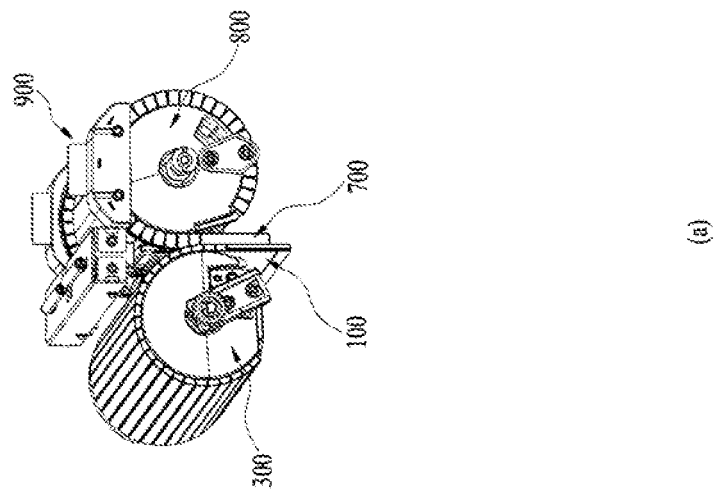

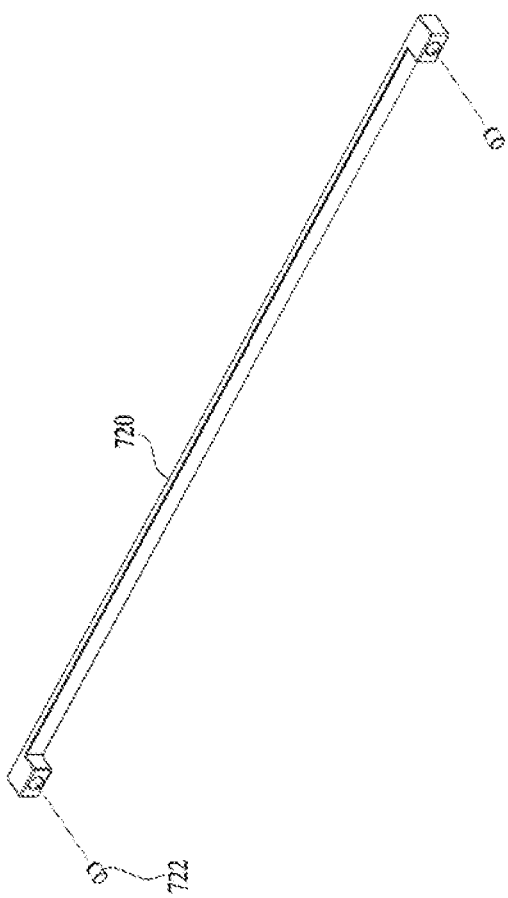

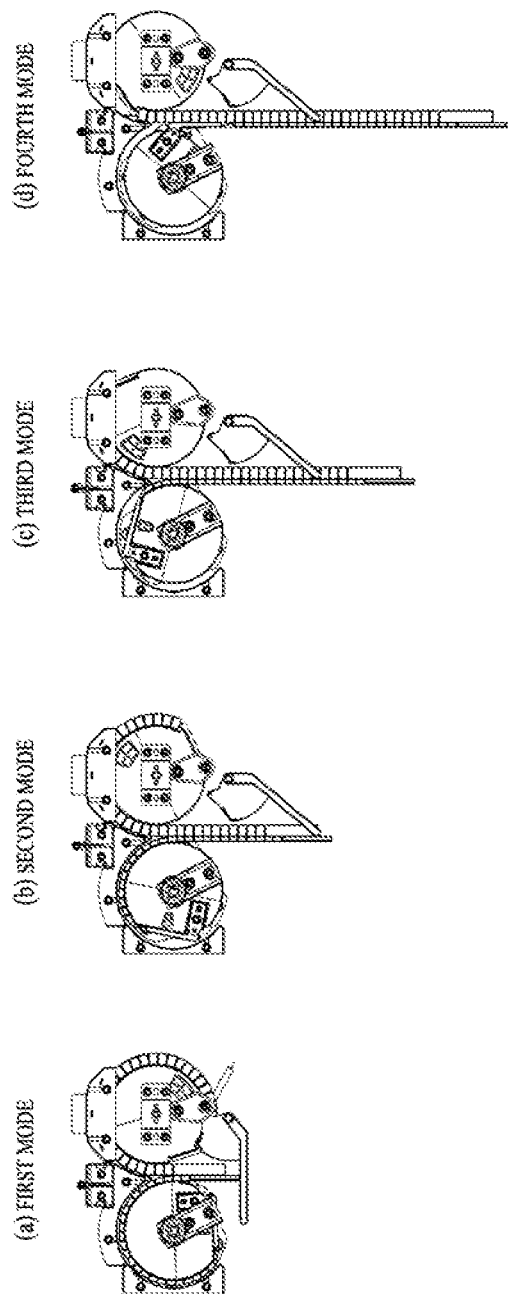

FLEXIBLE DISPLAY DEVICE AND METHOD FOR CONTROLLING THE SAME

CROSS-REFERENCE TO RELATED APPLICATIONS

This application claims the benefit of Korean Patent Application No. 10-2022-0103871, filed on Aug. 19, 2022, which is hereby incorporated by reference as if fully set forth herein.

TECHNICAL FIELD

The present embodiments relate to a flexible display device and a method for controlling the same, and relate to a device that may retract or extend a flexible display that may be bent or curved from a casing.

BACKGROUND

A display device may display various visual information on a screen. Such a display device may be installed on a dashboard of a vehicle disposed in front of a driver's seat and a front passenger seat, and may provide various convenience information such as navigation, vehicle management and manipulation, Internet, and entertainment.

In this regard, there is a movable display device. The movable display device may move vertically or horizontally against the dashboard. As the display moves along a guide, a driver and a front-seat passenger may selectively use the display. In the case of a pop-up-type display, the display may be accommodated and then be extended when needed.

A fixed display has limitations in terms of use of space within the vehicle because of a fixed installation location thereof, and negatively impacts forward visibility as a size of the display increases. The pop-up style movable display requires a separate accommodating space for the display, and has a problem that as the size of the display increases, a size of the accommodating space also increases, limiting the utilization of the vehicle space. In addition, in the pop-up style, the display is extended only in an upward direction from the accommodating space, so that an installation location and a range of use of the display device are limited. In addition, because the visual information is output from an entirety of the LCD screen of the display, there is inefficiency in that a great amount of power is used regardless of a degree of exposure of the display.

Therefore, it is required to develop a display device having a form and a structure capable of multiplying advantages while minimizing such disadvantages. Background art related thereto may refer to Patent No. 10-0821925 ('Apparatus for driving display').

SUMMARY

Embodiments of the present disclosure are to provide a display device capable of reducing an accommodating space of a display.

Embodiments of the present disclosure are to provide a display device capable of efficiently retracting or extending a display into or from an accommodating space.

In addition, embodiments of the present disclosure are to provide a display device capable of controlling a degree of exposure of a display based on a purpose of use of a display.

In addition, embodiments of the present disclosure are to provide a display device capable of saving power for outputting visual information on a display screen.

In addition, embodiments of the present disclosure are to provide a display device capable of extending a display in a downward direction from an accommodating space.

The problem to be solved by the present disclosure is not limited to the above, and other problems not mentioned will be clearly understood by those skilled in the art to which the present disclosure belongs from the description below.

A display device according to embodiments of the present disclosure includes a casing with an opening defined in a lower surface thereof, a display unit configured to be retracted into and extended out of the casing via the opening, a display driver for moving the display unit, and a display winder for winding the display unit thereon based on the movement of the display unit.

Preferably, the display unit may include a flexible display, and a display cover adhered to a rear surface of the display, and the display unit is selectively wound on and by the display winder.

In addition, preferably, the display winder may include a cylindrical rotary drum rotatable around a horizontal rotation shaft, and a radius of rotation R of the rotary drum may be at least 45 mm. In addition, the flexible display may be a plastic organic light-emitting diode (POLED).

Preferably, the display device may further include a display guide for guiding the movement of the display unit inside the casing, the display guide may include a curvature guide having a curved surface spaced a predetermined distance apart from an outer circumferential surface of the rotary drum, and the display unit may be wound between the curvature guide and the rotary drum.

Preferably, the display guide may include a straight guide for guiding a section of the flexible display where the display moves linearly inside the casing. The straight guide may include a plurality of rollers.

Preferably, the display driver may include a motor connected to the rotation shaft of the rotary drum, the motor is configured to rotate the rotation shaft to rotate the rotary drum, and the flexible display may be wound around the rotary drum by rotation of the rotary drum.

Preferably, the display driver may include a worm gear assembly connected to the motor and having a rotation shaft parallel to the motor, and a worm wheel assembly connected to the worm gear assembly and having a rotation shaft perpendicular to the motor, and the rotation shaft of the worm wheel assembly may as also be the rotation shaft of the rotary drum to move the display unit with rotation of the motor.

Preferably, a display support may include a first support arm having a first end pivotably connected to an upper point inside the casing and a second end connected to a rear surface of the display unit, wherein the first support arm pivots in a plane parallel to a screen of the display unit. In addition, the display support may further include a second support arm having one end connected to the second end of the first support arm and another end connected to a lower end of the display unit, wherein the second support arm pivots in the same plane as the first support arm, but pivots in a direction opposite to a pivoting direction of the first support arm.

Preferably, the first support arm may have a protrusion protruding from the first end thereof, a spring may be connected to the protrusion, and the spring may apply a force to pivot the first support arm in an extension direction of the display unit.

Preferably, the display device may further include a sensor assembly for sensing a rotation state of the rotary drum. The sensor assembly may include a plurality of sensors, and a sensed portion capable of being sensed by at least one of the plurality of sensors, the sensed portion may be connected to a side surface of the rotary drum, and said one of the plurality of sensors may recognize a different state than a state recognized by the other sensors based on the rotation state of the rotary drum.

Preferably, an extension range of the display unit may be controlled based on the rotation state of the rotary drum recognized by the sensor assembly.

Preferably, the display driver may control operation of a motor based on the rotation state of the rotary drum recognized by the sensor assembly.

Preferably, the sensed portion may have a hole defined therein, and the hole may be located in a recognition area of one of the plurality of sensors based on the rotation of the rotary drum.

Preferably, the display device may further include a rear protective cover detachable from a rear surface of the display unit and covering an exposed portion of the rear surface of the display unit. Each of the display unit and the rear protective cover may have a plurality of magnets, each magnet of the display unit and a respective magnet of the rear protective cover may be located at corresponding locations in a vertical direction, and the rear protective cover may be detached from the display unit by separating the respective magnets.

In addition, preferably, the rear protective cover may be removed from the display unit when the display unit is retracted into the casing. In addition, the display device may further include a cover winding drum capable of winding the rear protective cover removed from the display unit thereon.

A display device according to one embodiment of the present disclosure includes a casing with an opening defined in a lower surface thereof, a display unit capable of being retracted into and extended out of the casing via the opening, a display driver for moving the display unit, a display winder for winding the display unit thereon based on the movement of the display unit, a rear protective cover for covering a rear surface of the display unit, and a rear cover winder for winding the rear protective cover thereon, and the display unit includes a flexible POLED display.

In addition, in a display device, winding or unwinding of a flexible POLED display causes the display to be retracted into or extended from a casing, a flexible cover for protecting a rear surface of the display is attached to or detached from the rear surface of the display, and the cover is wound within the casing.

According to one of the embodiments of the present disclosure, the space utilization is increased by reducing the accommodating space for the display.

In addition, according to one of the embodiments of the present disclosure, usability of the display may be increased by adjusting the degree of exposure of the display, and the power may be saved by using the power only for the exposed portion of the display area.

In addition, according to one of the embodiments of the present disclosure, the flexible display may be retracted into or extended from the accommodating space while being safely protected.

In addition, according to one of the embodiments of the present disclosure, the flexible display may be extended in the downward direction.

Effects obtainable from the present disclosure are not limited to the effects mentioned above, and other effects not mentioned will be clearly understood by those skilled in the art from the description below.

BRIEF DESCRIPTION OF THE DRAWINGS

FIG. 9B shows a sensor and a sensed portion according to an embodiment of the present disclosure.

FIG. 11A shows the interior of a display device according to an embodiment of the present disclosure.

FIG. 12 shows a protective cover according to an embodiment of the present disclosure.

FIG. 14 shows a state in each mode of a display device according to an embodiment of the present disclosure.

DETAILED DESCRIPTION

Figure 1:
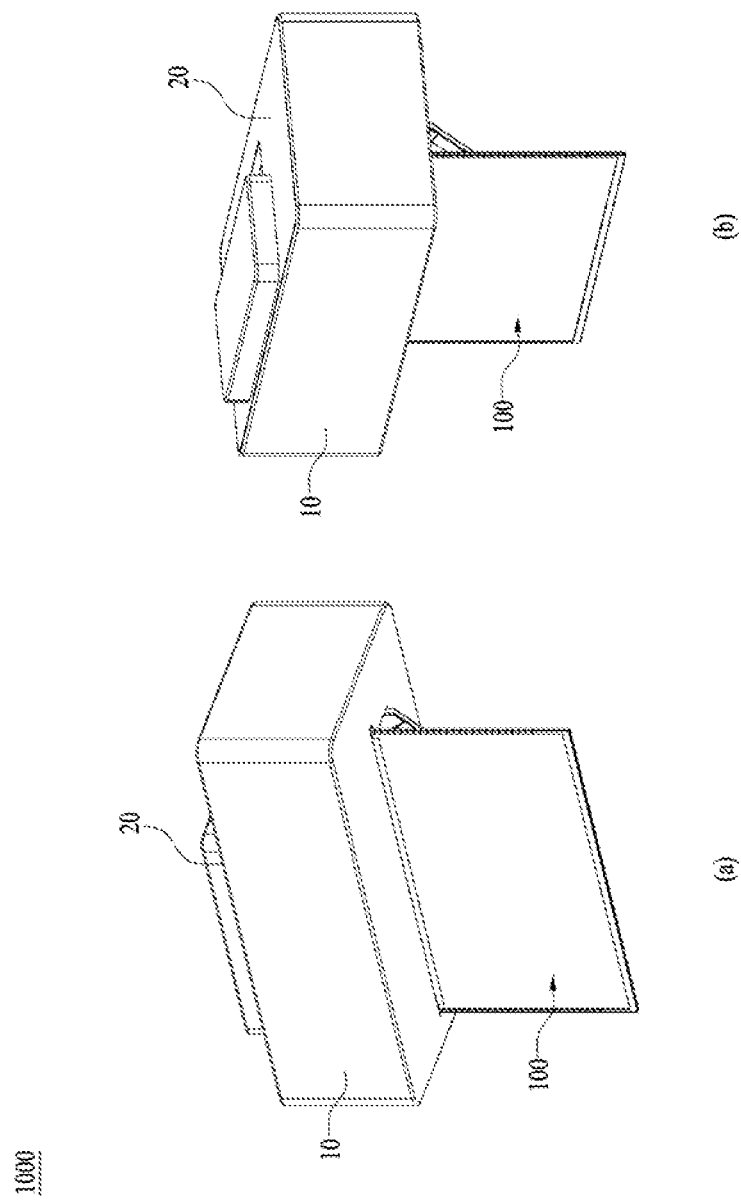
FIG. 1 is a perspective view of a display device according to an embodiment of the present disclosure.

Advantages and features of the present disclosure, and a method for achieving the same, will become apparent with reference to the embodiments described below in detail in conjunction with the accompanying drawings. However, the present disclosure may not be limited to the embodiments disclosed below, but may be implemented in a variety of different forms. The present embodiments are provided only to ensure that the disclosure of the present disclosure is complete, and to completely inform those skilled in the art to which the present disclosure belongs, the scope of the present disclosure. The present disclosure is only defined by the scope of the claims.

The terminology used herein is for the purpose of describing the embodiments only and is not intended to limit the present disclosure. As used herein, the singular forms "a" and "an" are intended to include the plural forms as well, unless the context clearly indicates otherwise. As used herein, "comprises" and/or "comprising" do not exclude the presence or addition of one or more other components in addition to a stated component Like reference numerals refer to like components throughout the specification, and "and/or" includes each of the mentioned components and every combination of one or more of the components. Although "first", "second", and the like are used to describe various components, it is apparent that such components are not limited by such terms. Such terms are only used to distinguish one component from another. Accordingly, it is apparent that the first component mentioned below may be the second component within the technical spirit of the present disclosure.

Unless otherwise defined, all terms including technical and scientific terms used herein have the same meaning as commonly understood by one of ordinary skill in the art to which the present disclosure belongs. In addition, terms defined in a commonly used dictionary are not to be interpreted ideally or excessively unless specifically defined explicitly.

Spatially relative terms "below", "beneath", "lower", "above", "upper", and the like may be used to easily describe a correlation between one component and other components as shown in the drawings. Spatially relative terms should be understood as terms including different directions of the components during use or operation in addition to directions shown in the drawings. For example, when a component shown in the drawings is flipped, a component described as being located "below" or "beneath" another component may be placed "above" said another component. Accordingly, the exemplary term "below" may include both downward direction and upward direction. Components may also be oriented in other directions, and thus, spatially relative terms may be interpreted based on the orientation.

Figure 2:
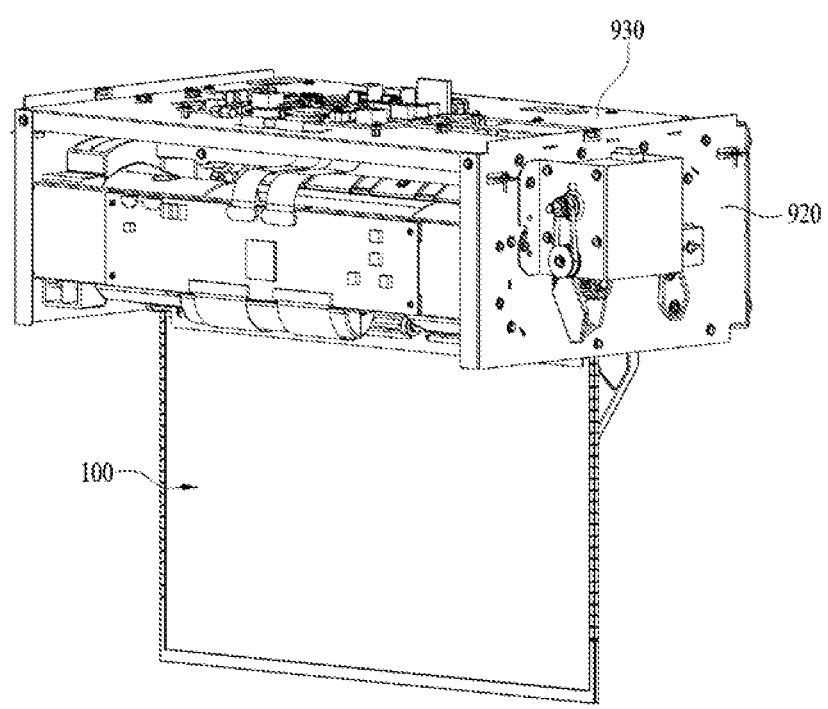
FIG. 2 is a front perspective view showing the interior of a display device according to an embodiment of the present disclosure.
Figure 3A:
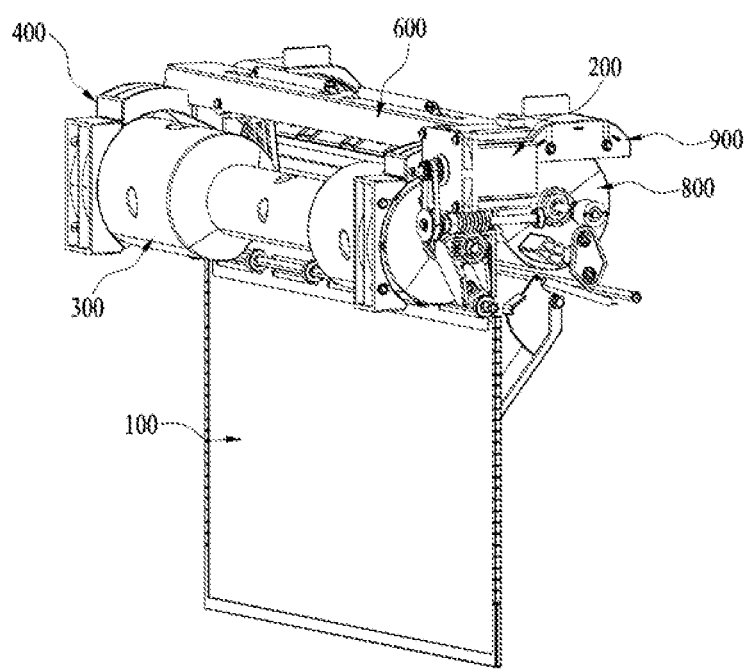
FIG. 3A is a front perspective view showing the interior of a display device according to an embodiment of the present disclosure.
Figure 3B:
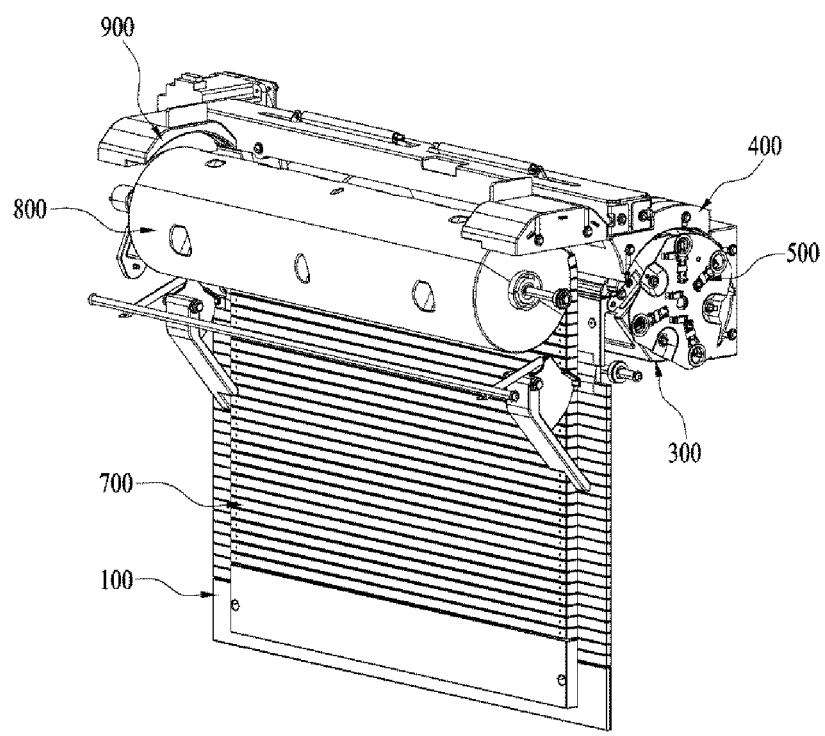
FIG. 3B is a rear perspective view showing the interior of a display device according to an embodiment of the present disclosure.

FIG. 1 is a perspective view of a flexible display device (hereinafter, referred to as a 'display device') 1000 according to an embodiment of the present disclosure. FIG. 2 is a front perspective view showing the interior of the display device 1000. FIGS. 3A and 3B are a front perspective view and a rear perspective view showing the interior of the display device 1000. FIGS. 3A and 3B show the interior of the display device 1000 in which a side frame 920 and an upper frame 930 in FIG. 2 are omitted.

Elements unnecessary for description, such as brackets or frames, screws, clips, rods (or bars), and the like, for fixing components may be omitted in the drawings. That is, in the drawings, some components may be omitted to illustrate components located inside a casing of the display device 1000, and components shown in each drawing may be included in the display device 1000.

(a) in FIG. 1 is a perspective view showing a lower right portion of the display device 1000, and (b) in FIG. 1 is a perspective view showing an upper right portion of the display device 1000. In FIG. 1, a direction in which a screen of a display unit 100 is oriented is defined as a forward direction, and a direction opposite thereto is defined as a rearward direction. In addition, upper and lower sides and right and left sides are defined based on the drawing. Hereinafter, the drawings will be described based on the directions defined in FIG. 1.

The display device 1000 includes a casing composed of a side casing 10 and an upper casing 20. The side casing 10 surrounds side surfaces of the display device 1000, and the upper casing 20 covers an upper portion of the display device 1000. The casing includes a lower surface connected to a lower end of the side casing 10, and the lower surface covers a lower portion of the display device 1000. The lower surface of the casing has an opening defined therein through which the display unit 100 may be retracted/extended.

In the display device 1000, the display unit 100 may be extended in a downward direction from the opening defined in the lower surface of the casing. A space for accommodating the display unit 100 therein may be defined inside the casing, and the display unit 100 may be wound and accommodated in the internal space of the casing. That is, the display unit 100 may be extended to the outside from the opening defined in the lower surface of the casing or may be retracted into the casing via the opening and accommodated inside the casing. The opening is defined in a size that allows the display unit 100 to be retracted or extended therethrough.

The casing protects components located in the internal space thereof and improves an outer appearance of the device. A shape of the casing is not limited to that shown in the drawings, and a person having ordinary knowledge in the technical field to which the present disclosure belongs (hereinafter, referred to as 'a person skilled in the art') may properly change the shape of the casing within the scope of the technical idea of the present disclosure.

FIG. 2 shows internal components of the casing of the display device 1000. Referring to FIG. 2, the display device 1000 may include a side frame 920 and an upper frame 930. The side frame 920 is a frame adjacent to an inner wall of the side casing 10, and the upper frame 930 is a frame adjacent to an inner wall of the upper casing 20. The frame may have a shape and fixing means (such as a bolt hole) for fixing components of the display device 1000 at intended locations. Although not shown in detail in the drawings, a PCB or a cable connected to the display unit 100, or other components may be placed at appropriate locations inside the casing using the frame.

FIGS. 3A and 3B show internal components of the display device 1000 in FIG. 2. In FIGS. 3A and 3B, all or some of the frames obstructing the view are omitted to show the internal configurations. Referring to FIGS. 3A and 3B, the display device 1000 may include the display unit 100, a display driver 200, a display winder 300, a display guide 400, sensor assembly 500, a display support 600, a rear protective cover 700, a cover winder 800, or a cover guide 900.

The display unit 100 includes components related to a display screen that outputs various information.

Figure 4A:
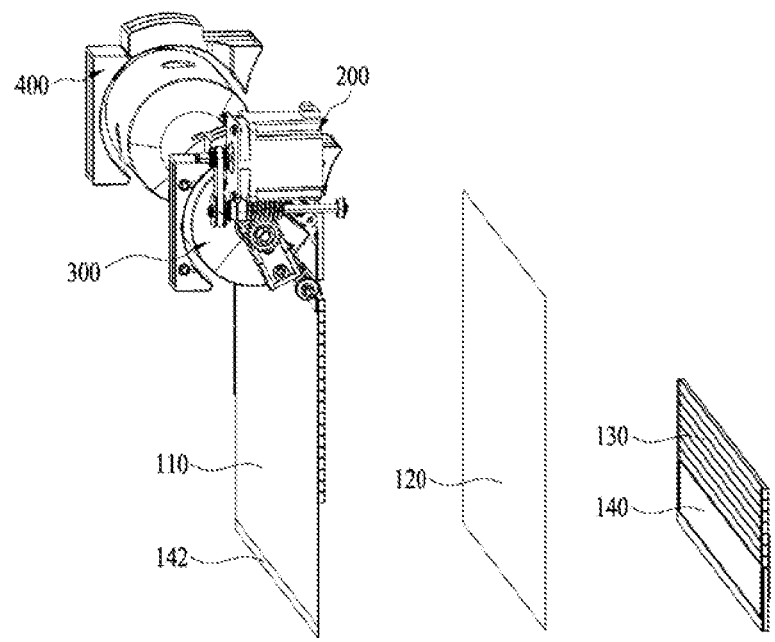
FIG. 4A is an exploded view of a display unit of a display device according to an embodiment of the present disclosure.

FIG. 4A, as an exploded view of the display unit 100, may show components of the display unit 100. The display unit 100 includes a display 110, a connection sheet 120, or a display cover 130.

The display 110 may be the flexible or rollable display 110. The display 110 may be a plastic organic light-emitting diode (POLED). The POLED, as an OLED to which a substrate of polyimide (PI), a type of plastic, is applied, may realize a curved surface.

The display 110 may be curved, and a radius of curvature at which the display 110 is curved may be equal to or greater than 50 mm. Preferably, the radius of curvature at which the display 110 is curved may be equal to or greater than 30 mm. The display 110 may include a light emitting diode (LED) including the OLED, an AMOLED, or the PMOLED. A width (in a horizontal direction) and a height (in a vertical direction) of the display 110 may be appropriately designed by a person skilled in the art.

One surface of the connection sheet 120 is in contact with a rear surface of the display 110, and a surface opposite thereto is in contact with the display cover 130. The connection sheet 120 may have adhesive properties on the front surface and the rear surface thereof so as to perform a function of adhering the display 110 and the display cover 130 to each other. The connection sheet 120 may be constructed with adhesive means such as an adhesive foam tape. The connection sheet 120 may be a foam tape divided based on a size of the display cover 130.

An upper end of the display unit 100 may be connected to a rotary drum 310 of the display winder 300, and may be flexible so as to be wound around the rotary drum 310.

The rear surface of the display 110 may be adhered to the display cover 130 by the adhesive means such as the connection sheet 120. The display unit 100 in which the display 110, the connection sheet 120, and the display cover 130 are coupled to each other may be wound or unwound by the display winder 300. Therefore, when the display unit 100 is retracted into the casing, the display winder 300 winds the display unit 100, and when the display unit 100 is extended to the outside of the casing, the display winder 300 unwinds the display unit 100. The display winder 300 winds the display unit 100 while an outer circumferential surface thereof is in contact with a front surface of the display unit 100. That is, the display winder 300 may be located in front of the display unit 100. However, the display winder 300 may not be restricted to being located in front of the display unit 100, and may be located at various positions based on whether components (the rear protective cover 700, the rear cover winder 800, and the like) exist or based on a vehicle structure for mounting the device.

The display cover 130 is a cover that protects the rear surface of the display 110. The display cover 130 may complement the display 110 having no rigidity. The display cover 130 may be formed in a shape that is longer in the horizontal direction than in the vertical direction. A plurality of display covers 130 may be adhered to the rear surface of the display 110 via double-sided adhesive means such as the FOAM tape. The double-sided adhesive means may be applied separately for each display cover 130.

A width of the display covers 130 may be equal to or greater than the width of the display 110. A height and a cross-sectional shape of the display covers 130 may be appropriately designed by a person skilled in the art, considering whether the display covers 130 can flexibly respond to the curving of the display 110. One display cover 130 may be adhered to the rear surface of the display 110 in the shape that is long in the horizontal direction, and the plurality of display covers 130 may be vertically arranged and uniformly adhered to the rear surface of the display 110. The connection sheet 120 may include various adhesive means for adhering the display cover 130 to the rear surface of the display 110.

The display unit 100 may be flexible and thus be wound around the rotary drum 310 of the display winder 300.

FIG. 4A shows a state in which the plurality of display covers 130 are removed only in a lower partial area of the display unit 100.

Figure 4B:
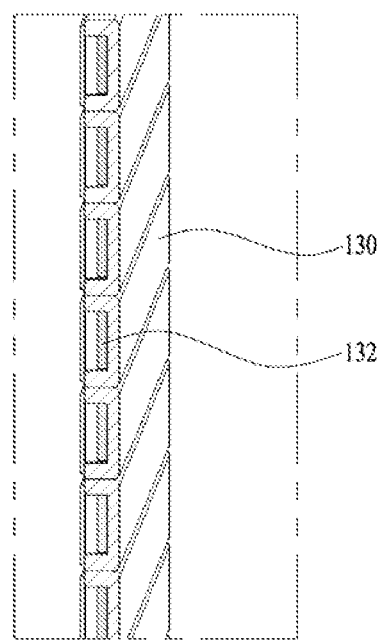
FIG. 4B shows a cross-section of a display cover of a display device according to an embodiment of the present disclosure.

FIG. 4B shows a cross-section of an end of the display cover 130 cut vertically. Referring to FIG. 4B, the display cover 130 may further include magnets 132 at both ends thereof in the horizontal direction. The magnet 132 may be utilized for the display cover 130 to be attached to or detached from the rear protective cover 700 (see FIG. 3B) to be described later. For example, the rear protective cover 700 (see FIG. 3B) may be attached to a rear surface of an exposed portion of the display unit 100, and a portion of the display unit 100 inside the casing may be separated from the rear protective cover 700.

The display unit 100 may further include a lower fixing plate 140, a lower fixing clip 142, and a connection reinforcement.

The lower fixing plate 140 may be a flat plate in surface contact with a lower partial area of the rear surface of the display 110. A width of the lower fixing plate 140 may be at least the same as the width of the display 110 or the same as the width of the display cover 130. The lower fixing clip 142 is a component that is connected to the lower fixing plate 140 at a lower end of a front surface of the display 110. A lower end of the display 110 may be fixed by connecting the lower fixing clip 142 and the lower fixing plate 140 to each other. The lower fixing plate 140 and the lower fixing clip 142 may protect the lower end of the flexible display 110, and the lower fixing plate 140 may be connected to the display support 600 to be described later.

A material of the lower fixing plate 140 and the lower fixing clip 142 may include aluminum (AL), and other materials with appropriate rigidity may be applied to the lower fixing plate 140 and the lower fixing clip 142 by a person skilled in the art.

Figure 4C:
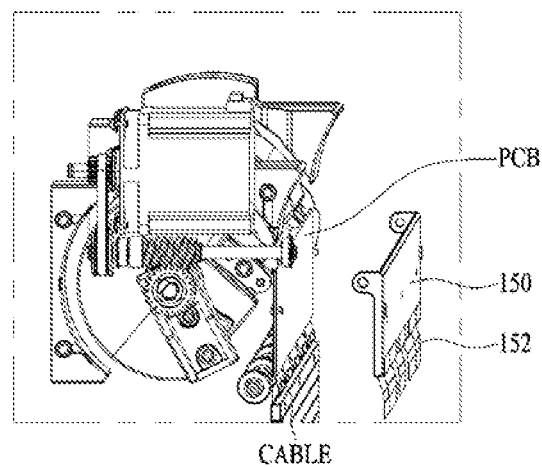
FIG. 4C is an exploded view of a connection portion of a display unit of a display device according to an embodiment of the present disclosure.

FIG. 4C is an enlarged view of a connection portion at an upper end of the display 110 to illustrate the connection reinforcement according to an embodiment. The connection reinforcement is a component that reinforces a vulnerable portion where the display 110 and the PCB are connected to each other.

As shown in FIG. 4C, the display 110 may be connected to the PCB via a flexible flat cable (FFC), and the PCB may be rotatably connected to the rotary drum 310 of the display winder 300. When the display unit 100 is retracted or extended by rotation of the rotary drum 310, there is a concern that the PCB or the FFC may be damaged by an external force, so that the connection reinforcement may include a PCB cover 150 and a cable cover 152 that may protect the PCB or the FFC. The PCB cover 150 and the cable cover 152 are located adjacent to rear surfaces of the PBC and the FFC cable, respectively. The PCB cover 150 is rotatably connected to the rotary drum 310 in close contact with the PCB, and the cable cover 152 is connected to the PCB cover 150 so as to cover the cable for connecting the PCB and the display 100 to each other.

The display 110 may be connected to a sPCB and a cPCB, and control of the display 110 may be performed by a main PCB.

The display driver 200 is a component that moves the display unit 100.

Some components are omitted in FIGS. 5A to 5E to show the rear surface of the display unit 100.

Referring to FIGS. 5A to 5E, the display device 1000 may include the display support 600.

Figure 5A:
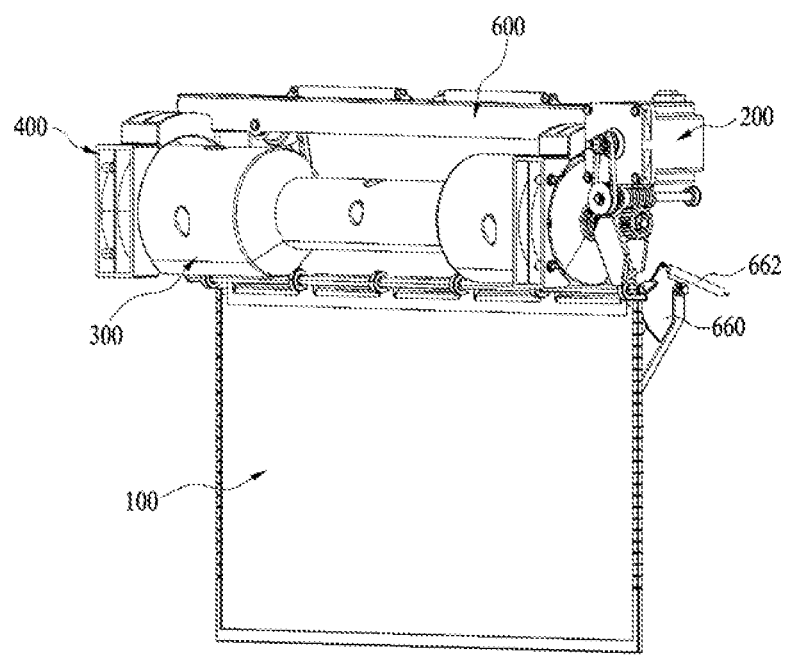
FIG. 5A is a front perspective view showing the interior of a display device according to an embodiment of the present disclosure.
Figure 5B:
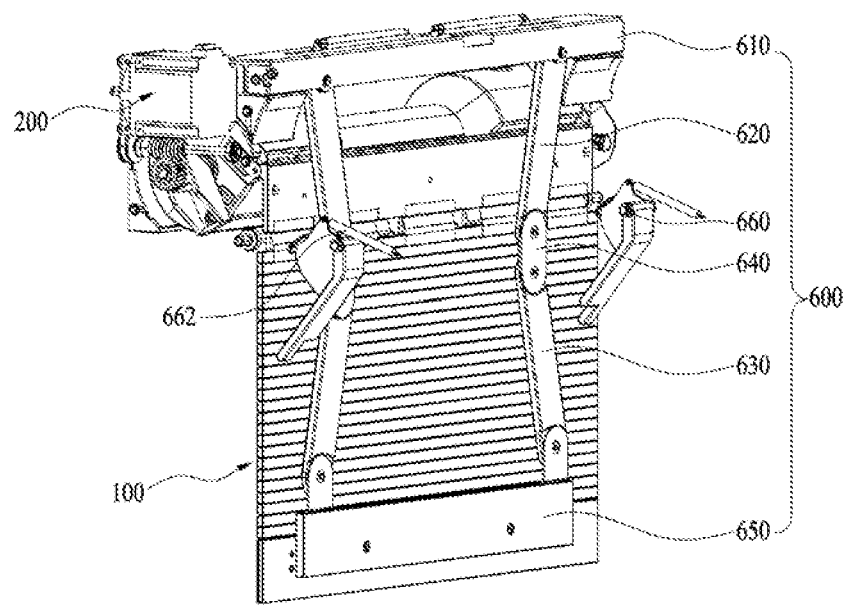
FIG. 5*b* is a rear perspective view showing the interior of a display device according to an embodiment of the present disclosure.

Referring to FIG. 5B, the display support 600 includes an upper bracket 610, a first support arm 620, a second support arm 630, an arm joint 640, and/or a lower fixing joint 650. In addition, the display support 600 may further include a support bar 660 and a spring 662.

The display support 600 supplements rigidity of the flexible display unit 100, allowing the extended display unit 100 to maintain a straight and flat shape.

The upper bracket 610 is disposed in a space above the display unit 100, and provides a point where an end (an upper end) of the first support arm 620 may be pivotably connected. The end of the first support arm 620 may be pivotably connected to one point of the upper bracket 610.

The first support arm 620 is an arm member that has one end (the upper end) pivotably connected to the upper bracket 610 and pivots based on the movement of the display unit 100. The first support arm 620, as the arm member having a predetermined length, pivots on a virtual plane parallel to an exposed surface of the display unit 100. The first support arm 620 is located adjacent to the rear surface of the display unit 100.

One end (an upper end) of the second support arm 630 is pivotably connected to the other end (a lower end) of the first support arm 620, and the other end (a lower end) of the second support arm 630 is pivotably connected to a lower end of the display unit 100. The first support arm 620 and the second support arm 630 may be connected to each other in a form in which toothed gears are meshed with each other, as shown in FIG. 5E. The first support arm 620 and the second support arm 630 are connected to each other by the gears (for example, spur gears), so that when the first support arm 620 pivots, the second support arm 630 also pivots. Accordingly, the first support arm 620 and the second support arm 630 may pivot together based on the movement of the display unit 100.

The second support arm 630, as an arm member having a predetermined length, may pivot on a virtual plane parallel to the exposed surface of the display unit 100. That is, the second support arm 630 may pivot on the same plane as the pivot plane of the first support arm 620. However, the second support arm 630 pivots in a direction opposite to that of the first support arm 620. For example, when the first support arm 620 pivots clockwise, the second support arm 630 pivots counterclockwise. The second support arm 630 may be located adjacent to the rear surface of the display unit 100.

The display support 600 may further include the arm joint 640 to maintain the connection between the first support arm 620 and the second support arm 630. The arm joint 640 functions to ensure that a gearwheel of the first support arm 620 and a gearwheel of the second support arm 630 are well engaged with each other. The arm joint 640 has one end pivotably connected to the first support arm 620 and the other end pivotably connected to the second support arm 630.

A joint spacer 642 may be disposed at a connection portion where the first support arm 620 and the second support arm 630 are in surface contact with the arm joint 640 so as to eliminate a gap resulted from an assembly tolerance. The joint spacer 642 may be positioned between the first support arm 620 and the arm joint 640 and between the second support arm 630 and the arm joint 640 to fill a clearance space generated between the arm joint 640 and the driving arms. Therefore, the joint spacer 624 minimizes tilt of the display unit 100 caused by the gap.

The first support arms 620 may be disposed in a bilaterally symmetric manner with respect to a center of the display unit 100. In addition, the second support arms 630 may be disposed in a bilaterally symmetric manner with respect to the center of the display unit 100. That is, the display support 600 may include a pair of first support arms 620 disposed in a bilaterally symmetric manner and a pair of second support arms 630 disposed in a bilaterally symmetric manner. In this regard, pivoting directions of the two (the pair of) first support arms 620 are opposite to each other. In addition, pivoting directions of the two (the pair of) second support arms 630 are opposite to each other. For example, when viewing the rear surface of the display unit 100 (see FIG. 10B), a left first support arm pivots counterclockwise when a right first support arm pivots clockwise.

The lower ends of the pair of second support arms 630 may be pivotably connected to the lower end of the display unit 100, and the display support 600 may include the lower fixing joint 650 for connecting the second support arms 630 to the lower end of the display unit 100. The lower fixing joint 650 is a component having a predetermined length in the horizontal direction and is pivotably connected to the lower ends of the second support arms 630. The lower fixing joint 650 may provide points at which the support arms may be connected to the display unit 100. The lower fixing joint 650 is connected to the lower fixing plate 140 of the display unit 100.

The first support arm 620 and the second support arm 630 may contain a metal material, which may be aluminum (AL). Materials of the arm joint 640 and the lower fixing joint 650 may include steel electrolytic cold commercial (SECC) or SUM specified in Korean Industrial Standards (KS). Materials of the joint spacer 624 include PET.

In one example, the first support arm 620 includes a protrusion 622 protruding from the upper end thereof, and the protrusion 622 is connected to a spring 624. The spring 624 applies a force to the protrusion 622, and a direction of the force is a direction in which the first support arm 620 pivots in a direction in which the display unit 100 is exposed. That is, the spring 624 pulls the protrusion 622 toward the center in the horizontal direction.

Figure 5C:
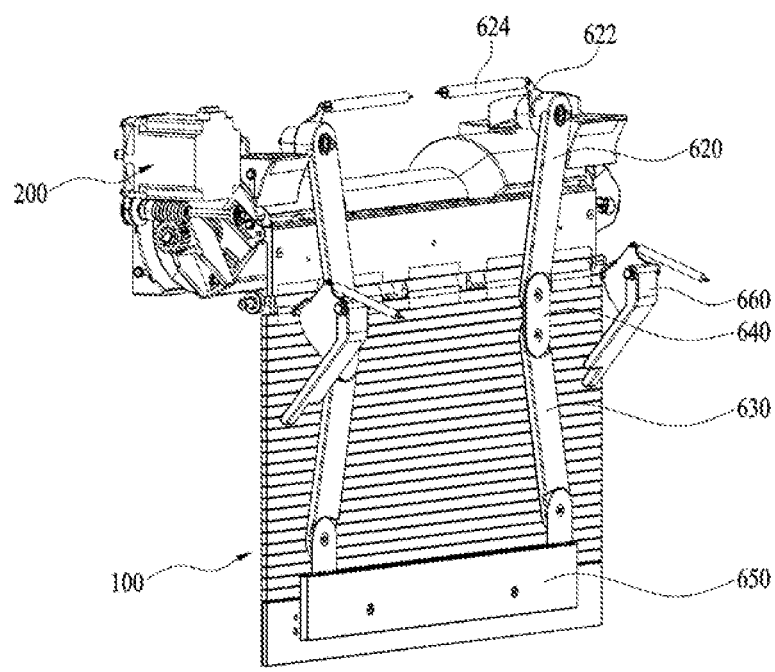
FIG. 5C is a rear perspective view showing the interior of a display device according to an embodiment of the present disclosure.

Referring to FIG. 5C, the right first support arm 620 shown in the drawing has the protrusion 622 at the upper end thereof. In addition, one end of the spring 624 is connected to the protrusion 622, and the other end of the spring 624 is connected to a central portion of the upper bracket 610. Accordingly, the spring 624 pulls the protrusion 622 of the right first support arm 620 toward the central portion of the upper bracket 610. In this regard, the direction in which the protrusion 622 is pulled is the direction in which the display unit 100 is exposed while the right first support arm 620 pivots counterclockwise. Eventually, the spring 624 applies the force in the direction in which the display unit 100 is exposed. Therefore, the display unit 100 may always receive a tensile force in an unfolding direction, and the unfolded display unit 100 may be maintained straight by the force of the spring 624.

Referring to FIG. 5C, the spring 624 may be connected to the protrusion 622 disposed at the upper end of the left first support arm 620, and the spring 624 may pull the protrusion of the left first support arm 620 toward the central portion of the upper bracket 610.

The spring 624 applies the force such that the first support arm 620 pivots in the direction in which the display unit 100 is unfolded.

Figure 5D:
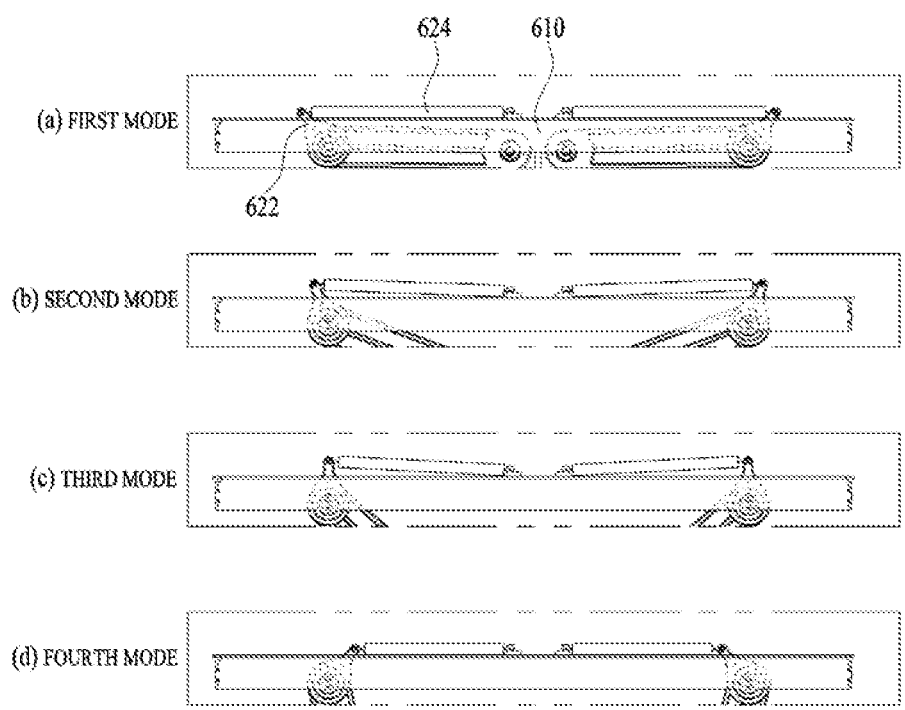
FIG. 5D shows a state of a spring for each mode of a display device according to an embodiment of the present disclosure.
Figure 5E:
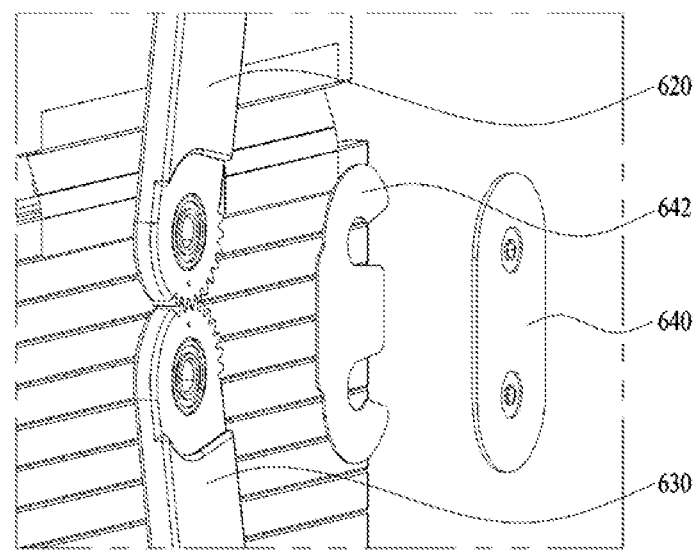
FIG. 5E is an exploded view of a portion of an arm joint of a display device according to an embodiment of the present disclosure.

FIG. 5D shows an appearance of the spring 624 and the protrusion 622 based on a degree of extension of the display unit 100. A first mode represents a state in which the display unit 100 is not extended, and a fourth mode represents a state in which an entirety of the display unit 100 is extended.

Referring to FIG. 5D, the more the display unit 100 is extended, the shorter the spring 624 is. Therefore, an amount of tension applied to the spring 624 may also decrease as the display unit 100 is extended.

In one example, referring to FIGS. 5B and 5C, one end of the support bar 660 may be pivotably connected to a point in the internal space of the casing, and the other end of the support bar 660 may be in contact with the rear surface of the display unit 100 to support the display unit 100. A pivot plane of the support bar 660 may be perpendicular to the screen of the display unit 100, and a pivot angle of the support bar 660 may be limited within a predetermined range. In addition, the support bar 660 is connected to the spring 662 and has a force to pivot in a certain direction by the spring 662.

The spring 662 applies a force to the support bar 660 such that the other end of the support bar 660 moves in an upward direction. One end of the spring 662 may be connected to one end of the support bar 660, and the other end of the spring 662 may be connected to the lower surface of the casing. When the spring 662 applies the force to the support bar 660, the support bar 660 tries to pivot in a direction in which the other end thereof ascends.

When the display unit 100 is extended in the downward direction, the other end of the support bar 660 is pushed by the display unit 100 being extended and pivots in the downward direction, and the other end of the support bar 660 supports the rear surface of the display unit 100 in the state in which the display unit 100 is extended. Because the support bar 660 tries to pivot in the upward direction by the spring 662, the other end of the support bar 660 may support the rear surface of the display unit 100 with such force.

When the display unit 100 is retracted in the upward direction, the other end of the support bar 660 maintains the state of supporting the rear surface of the display unit 100, that is, the state in which the support bar 660 is pivoted in the downward direction. When the display unit 100 is retracted and the lower end of the display unit 100 is positioned higher than the other end of the support bar 660, the other end of the support bar 660 may pivot in the upward direction by the spring 662.

FIG. 14 shows pivoting of the support bar 660 for each mode of the display unit 100. As shown in FIG. 14, in the first mode, the support bar 660 supports the lower end of the display unit 100 across an entrance of the display unit 100. When the display unit 100 is retracted (a second mode to the fourth mode), the support bar 660 may be pivoted in the downward direction by a predetermined angle by the descending display unit 100, and the support bar 660 may support the rear surface of the display unit 100 with elasticity of the spring 662 connected to the support bar 660. The other end of the support bar 660 represents a portion of the support bar 660 exposed to the outside of the casing.

One end of the support bar 660 may be pivotably connected to the point in the casing, but the other end of the support bar 660 may be exposed to the outside of the casing. The portion of the support bar 660 may be exposed to the outside of the casing, and the opening may be defined in the lower surface of the casing so as to expose the other end of the support bar 660. A size and a shape of the opening may be properly designed so as to adjust a maximum pivot angle of the support bar 660. In addition, at least two support bars 660 may be disposed in a bilaterally symmetric manner.

Figure 6:
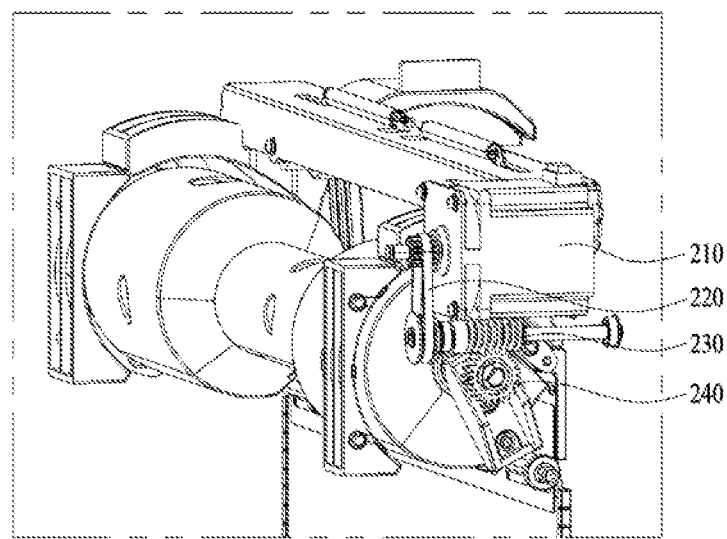
FIG. 6 shows a display driver of a display device according to an embodiment of the present disclosure.

FIG. 6 shows the display driver 200 of the display device 1000. The display driver 200 may include a motor 210, a timing belt 220, a worm gear assembly 230, and/or a worm wheel assembly 240.

The motor 210 provides power to move the display winder 300. The motor 210 may be connected to the rotary drum 310 to rotate the rotary drum 310. Various gear parts may be used to connect the motor 210 and the rotary drum 310 to each other.

As shown in FIG. 6, the timing belt 220 is connected to a rotation shaft of the motor 210, and the worm gear assembly 230 is connected to the timing belt 220 to rotate. The worm wheel assembly 240 is engaged with the worm gear assembly 230 to rotate, and is connected to a rotation shaft of the rotary drum 310 to transmit the power of the motor 210 to the rotary drum 310. When the rotary drum 310 is rotated by the motor 210, as the display unit 100 is wound around or unwound from the rotary drum 310 based on a rotation direction of the rotary drum 310, an extension range of the display unit 100 may be controlled. At the same time, based on the movement of the display unit 100, the first support arm 620, the second support arm 630, and/or the support bar 660 of the display support 600 may move to support the rear surface of the display unit 100.

In one example, rotation of the motor 210 may be controlled by a controller (not shown). For example, the controller (not shown) may control the operation of the motor 210 for appropriate retraction or extension of the display unit 100. A size of an area of the display unit 100 extended to the outside of the casing may vary depending on the mode, and the motor 210 may control the operation based on the mode selected by a user to adjust an exposure range of the display unit 100. The motor 210 may be a stepping or hybrid motor. The controller (not shown) may be an integrated controller or a head unit of the vehicle. Alternatively, the controller (not shown) may be constituted by software, hardware, a processor, or a combination thereof for controlling the display device.

The worm gear assembly 230 includes a rod rotating with a rotation shaft parallel to the rotation shaft of the motor 210 and a worm gear connected to the rod. The worm gear assembly 230 may rotate by the rotation of the motor 210, and may operate by being connected to the motor 210 using the timing belt 220. That is, the motor 210 may rotate the rod of the worm gear assembly 230 by the timing belt 220.

The worm wheel assembly 240 is connected to the worm gear assembly 230 and includes a worm wheel gear having a rotation shaft perpendicular to the rotation shaft of the motor 210 or the worm gear assembly 230. As shown in FIG. 6, the rotation shaft of the worm wheel assembly 240 is the same as the rotation shaft of the rotary drum 310. Therefore, when the worm wheel assembly 240 rotates by the rotation of the motor 210, the rotary drum 310 rotates.

Materials of the worm wheel gear may include polyoxymethylene (POM), and materials of the worm gear may include brass.

Figure 7:
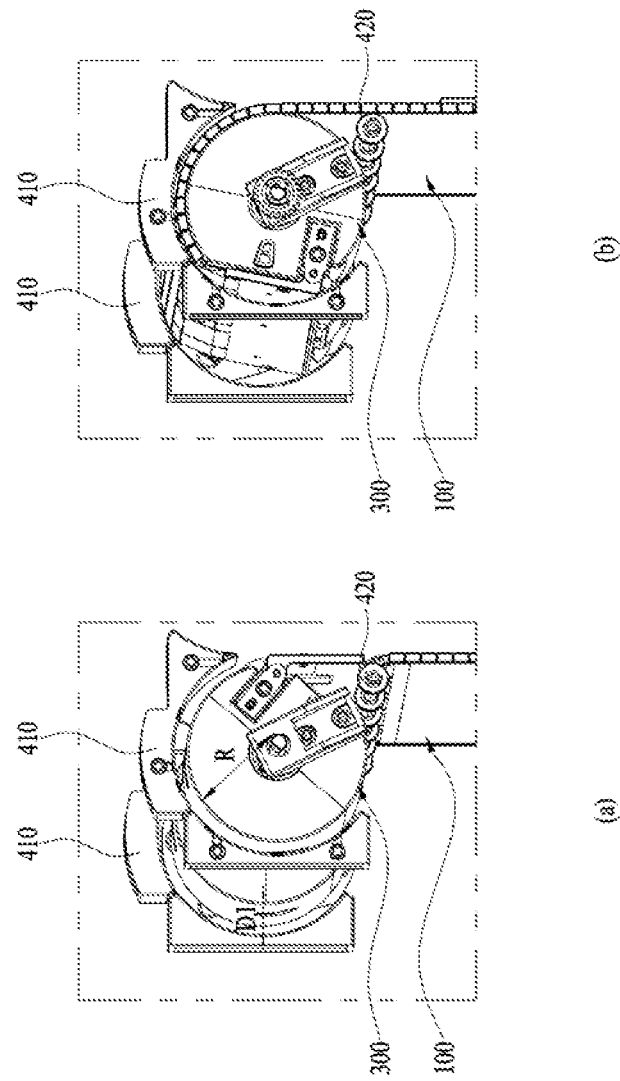
FIG. 7 shows a display winder and a display guide of a display device according to an embodiment of the present disclosure.

FIG. 7 shows the display winder 300 and the display guide 400 of the display device 1000. The display winder 300 and the display guide 400 are located inside the casing.

The display guide 400 is a component that guides the display unit 100 that is wound around the rotary drum 310. The display guide 400 includes a curvature guide 410 and a straight guide 420. The curvature guide 410 is spaced apart from an outer circumferential surface of the rotary drum 310 by a predetermined distance D1 to guide the display unit 100. That is, the display unit 100 may be guided by the distance D1 between the curvature guide 410 and the outer circumferential surface of the rotary drum 310. D1 is equal to or greater than a thickness of the display unit 100. The curvature guide 410 has a concave curved surface having a radius of curvature corresponding to a radius R of the rotary drum 310+D1. At least two curvature guides 410 may be disposed in a bilaterally symmetric manner to guide the display unit 100 uniformly.

The straight guide 420 is located inside the opening through which the display unit 100 is retracted or extended, and includes a plurality of rollers that are in contact with the front surface of the display unit 100.

The straight guide 420 may be composed of a rod oriented in the horizontal direction inside the display device 1000 and the plurality of rollers connected to the rod. The straight guide 420 allows the display unit 100 to be wound uniformly while being retracted/extended. The straight guide 420 may guide a straight moving section of the display unit 100 inside the casing.

The display guide 400 is located inside the casing and guides the movement of the display unit 100. The curvature guide 410 may guide the movement of the display unit 100 such that a path along which the display unit 100 moves has a radius of curvature in a range from 30 mm to 70 mm. Preferably, the curvature guide 410 may guide the movement of the display unit 100 such that the radius of curvature R of the path along which the display unit 100 moves is in a range from 45 mm to 55 mm. In addition, the curvature guide 410 may guide the display unit 100 with the concave curved surface corresponding to the radius R of the rotary drum 310. The display unit 100 may be curved based on the radius of curvature guided by the curvature guide 410 or a curvature of the outer circumferential surface of the rotary drum 310 while being retracted into or extended from the casing.

(b) in FIG. 7 shows a state in which a partial area of the display unit 100 is wound around the rotary drum 310. As shown in FIG. 7, the display unit 100 may be guided by the display guide 400 and wound around the rotary drum 310.

Materials of the plurality of rollers of the straight guide 420 may include rubber or polyoxymethylene (POM). In addition, materials of a frame or a bracket capable of fixing the rollers may include steel electrolytic cold commercial (SECC) or SUM specified in Korean Industrial Standards (KS).

The display guide 400 may perform a guide function in a scheme different from that shown in the drawing. That is, the display guide 400 may apply a guide composed of rollers rather than an integral guide as shown in the drawing. In addition, various guide schemes may be applied, and a person skilled in the art may apply the various guide schemes.

Figure 8:
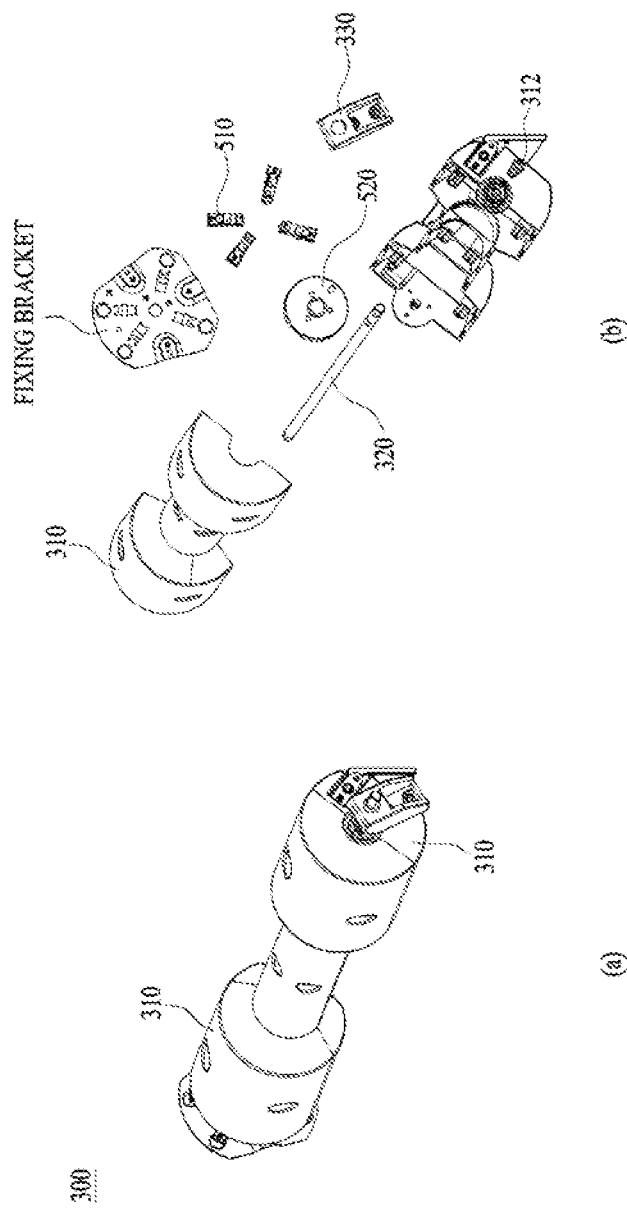
FIG. 8 shows a display winder and sensor assembly of a display device according to an embodiment of the present disclosure and an exploded view thereof.

FIG. 8 shows the display winder 300 and the sensor assembly 500 of the display device 1000 and an exploded view thereof.

The display winder 300 is a component that may wind the display unit 100 based on the movement of the display unit 100.

The display winder 300 may include the rotary drum 310, a rotary drum shaft 320, and/or a rotary drum stopper 312. The display winder 300 includes the components that are involved in winding the display unit 100.

The rotary drum 310 has a cylindrical shape and rotates using a central axis of the cylinder as a rotation axis. The rotary drum shaft 320 of the rotary drum 310 is horizontally oriented inside the casing, and the rotary drum shaft 320 is connected to the motor 210. In addition, the rotary drum 310 may wind or unwind the flexible display unit 100 on the cylindrical outer circumferential surface thereof.

The rotary drum 310 may be rotated by the motor 210. The rotary drum 310 rotates with the power of the motor 210 to wind or unwind the display unit 100 based on the rotation direction thereof.

A radius of curvature (or a radius of rotation) of the outer circumferential surface of the rotary drum 310 is equal to or greater than 45 mm. Preferably, the radius of curvature (or the radius of rotation) R of the outer circumferential surface of the rotary drum 310 may be equal to or greater than 30 mm. A degree of curvature of the display unit 100 wound around the outer circumferential surface of the rotary drum 310 varies based on the radius R of the rotary drum 310. As the radius R of the rotary drum 310 increases, the display unit 100 is curved less, and as the radius R decreases, the display unit 100 is curved more. Therefore, the radius R of the rotary drum 310 may be designed differently depending on an ability of the display unit 100 to be curved. In addition, the radius R of the rotary drum 310 is designed considering whether a length of a circumference of the rotary drum 310 is sufficient. Therefore, the radius R of the rotary drum 310 may be designed to be sufficiently great such that portions of the display unit 100 do not overlap. The rotary drum 310 may wind or unwind the entirety of the display unit 100 within one rotation.

The rotary drum 310 may further include the rotary drum stopper 312. The rotary drum stopper 312 protrudes from one side surface of the rotary drum 310. Accordingly, as the rotary drum 310 rotates, the rotary drum stopper 312 also rotates around the rotation shaft. In addition, the display device 1000 includes a fixed stopper 330 fixed at one location on a movement path of the rotary drum stopper 312. Therefore, when the rotary drum stopper 312 rotates and touches the fixed stopper 330, the rotary drum 310 cannot further rotate in the same direction. For example, when the display unit 100 is maximally exposed, the fixed stopper 330 prevents the rotary drum 310 from moving in a direction in which the display unit 100 is further exposed. Therefore, the fixed stopper 330 may prevent the rotary drum 310 from excessively rotating. A location of the fixed stopper 330 may be fixed at the inner frame of the casing or the like.

Materials of the rotary drum 310 include acrylonitrile butadiene styrene (ABS). Materials of a bracket related to the display winder 300 include steel electrolytic cold commercial (SECC).

In the rotary drum 310, a radius of rotation of a cross-section of a central portion may be smaller than a radius of rotation of a cross-section of each of both left and right ends. When the radius of rotation of the cross-section of the central portion is smaller than that of the cross-section of each of both ends, a volume and a weight of the rotary drum 310 itself may be reduced, and a size of an area of the outer circumferential surface of the rotary drum 310 that directly rubs against the screen of the display unit 100 may be reduced, preventing damage to the display 110. In the rotary drum 310, a portion with a cross-section having a small radius of rotation compared to that of the cross-section of each of both left and right ends may be a portion having a horizontal length in a range from 0% to 90% of a total horizontal length of the rotary drum 310. For example, in the case of 50%, a cross-section of a portion having a length of 25% of the total horizontal length in a leftward direction and a length of 25% of the total horizontal length in a rightward direction from a horizontal center may have a radius of rotation smaller than that of the cross-section of each of both left and right ends. In the rotary drum 310, the portion having the relatively smaller radius of rotation may be disposed in a bilaterally symmetric manner.

Figure 9A:
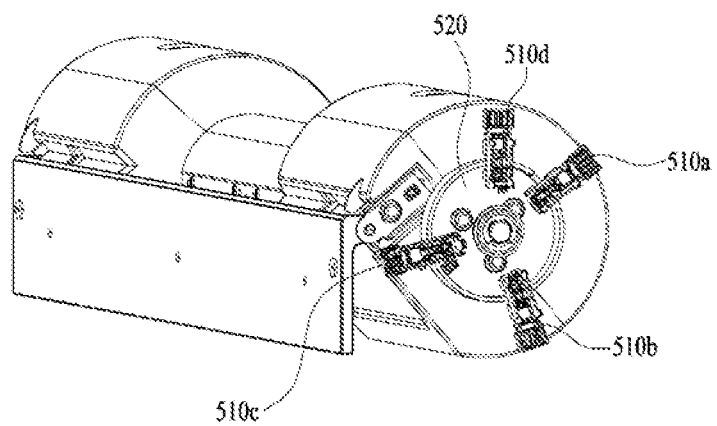
FIG. 9A illustrates sensor assembly of a display device according to an embodiment of the present disclosure.

FIG. 9A shows the sensor assembly 500 of the display device 1000.

The sensor assembly 500 senses the rotation state of the rotary drum 310. The sensor assembly 500 may include a plurality of sensors 510 and a sensed portion 520 sensed by the plurality of sensors. The sensed portion 520 may be connected to one side surface of the rotary drum 310 and rotate together, and may be sensed by at least one of the plurality of sensors 510. The sensors 510 may be fixed in position on the frame located inside the casing. The side surface of the rotary drum 310 to which the sensed portion 520 is connected represents a surface perpendicular to the rotation shaft of the rotary drum 310.

Sensing states of the plurality of sensors 510 may be different from each other based on the rotation state of the rotary drum 310, and the operation of the motor 210 may be controlled based on the sensing states of the plurality of sensors 510. In other words, one of the plurality of sensors 510 recognizes a state different from a state recognized by the other sensors based on the rotation state of the rotary drum 310, and the operation of the motor 210 may be controlled accordingly. Therefore, the display device 1000 according to an embodiment may control the extension range of the display unit 100 by recognizing the rotation of the display winder 300 via the sensor assembly 500.

Referring to FIG. 9A, the plurality of sensors 510 are fixed at locations where the rotation of the rotary drum 310 may be sensed. The plurality of sensors 510 may be fixed inside the casing so as to sense the sensed portion 520 connected to the rotary drum 310. Therefore, the sensors 510 do not rotate together with the rotary drum 310 and are remained at the constant locations.

The sensed portion 520 is connected to the rotary drum 310 and rotates, and the sensed portion 520 is formed in a shape such that a sensing state of one of the plurality of sensors 510 and a sensing state of the other sensors are different from each other. For example, in a case in which the plurality of sensors 510 are composed of a first sensor 510a, a second sensor 510b, a third sensor 510c, and a fourth sensor 510d, when the first sensor 510a recognizes the sensed portion 520 (an ON state), the second sensor 510b to the fourth sensor 510d do not recognize the sensed portion 520 (an OFF state). Conversely, the first sensor 510a may not recognize the sensed portion 520 (the OFF state), and the second sensor 510b to the fourth sensor 510d may recognize the sensed portion 520 (the ON state).

The sensed portion 520 is connected to one side surface of the rotary drum 310, and the sensed portion 520 includes a hole 522 defined therein that may be recognized by the sensors 510. The sensors 510 may include a photosensor.

When the rotary drum 310 rotates, a location of the hole 522 also varies together around the rotation shaft. When the hole 522 passes through a recognition area 512 of one of the sensors 510, the corresponding sensor recognizes the hole 522 to sense the rotation state of the rotary drum 310. Accordingly, when the rotation states of the rotary drum 310 respectively correspond to the plurality of modes, the extension range of the display unit 100 may be controlled.

FIG. 9B shows the sensor 510 and the sensed portion 520.

(a) in FIG. 9B shows the hole 522 defined in the sensed portion 520. As the rotary drum 310 rotates, the sensed portion 520 rotates, and a movement path of the hole 522 passes through the respective recognition areas of the plurality of sensors 510.

(b) in FIG. 9B shows the sensor 510 and the recognition area 512 of the sensor 510.

When the hole 522 passes through the recognition area 512 of one of the plurality of sensors 510, the corresponding sensor may recognize the hole 522, so that the rotation state of the rotary drum 310 may be identified. The sensed portion 520 includes one hole 522. Accordingly, when one of the plurality of sensors recognizes the hole 522, the other sensors do not recognize the hole 522.

As another embodiment, the sensed portion may include a plurality of holes, and the sensor may recognize the rotation state of the rotary drum by counting the number of holes that have passed through the recognition area. For example, when the number of holes that have passed through the recognition area of the sensor is 3, the sensor assembly may recognize that the rotary drum is in the third mode.

Figure 10A:
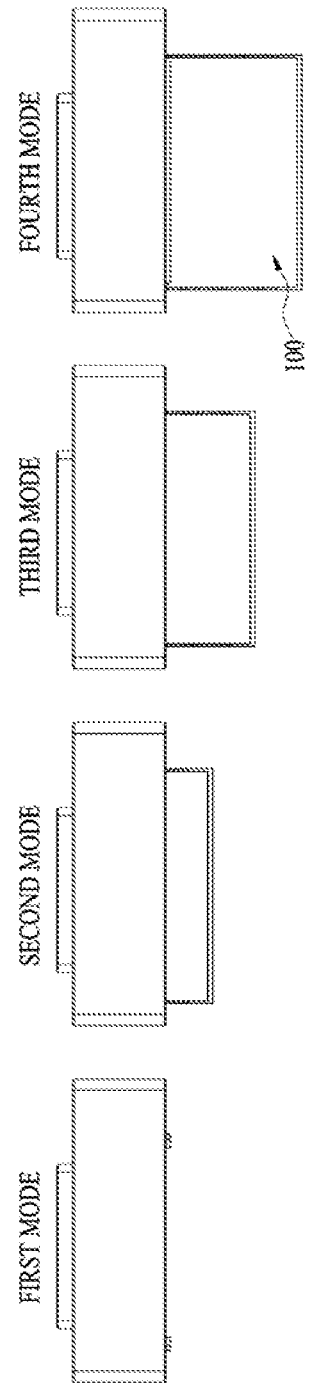
FIG. 10A illustrates modes of a display device according to an embodiment of the present disclosure.

FIG. 10A illustrates the modes of the display device 1000.

Referring to FIG. 10A, each of the four modes has a different extension range of the display unit 100. Although the four modes are shown in the drawing, the number of modes may be greater or smaller.

The first mode, as a state in which the display unit 100 is retracted into the casing, is a state in which the rotary drum 310 winds the display unit 100 as much as possible. When the second mode is executed by user's selection, the display driver 200 may operate the motor 210 to rotate the rotary drum 310 and extend the display unit 100 out of the casing.

When the display unit 100 is extended to a degree corresponding to the second mode, the sensor assembly 500 may recognize that the second mode is activated. That is, a sensing state of one specific sensor representing the second mode among the plurality of sensors 510 and a sensing state of the other sensors become different from each other. That is, the hole 522 of the sensed portion 520 may be located in a recognition area of the specific sensor 510 representing the second mode. The display device 1000 may recognize the second mode and stop the motor 210.

In the case of the third mode, the display unit 100 is extended more than in the second mode. When the third mode is executed by the user's selection, the display driver 200 operates the motor 210 to further extend the display unit 100. When the sensor assembly 500 recognizes that the third mode is activated, the motor 210 stops.

In the same way, the display device 1000 may differently control the degree of extension of the display unit 100 based on the various modes. The modes may be classified into four, with the state in which the display unit 100 is completely retracted into the casing as the first mode and the state in which the display unit 100 is completely extended as the fourth mode. Each mode may be distinguished based on a type and a function of information displayed on the display 110. For example, the third mode may be used on a navigation screen, and the fourth mode may be used when a video or a game is executed.

Figure 10B:
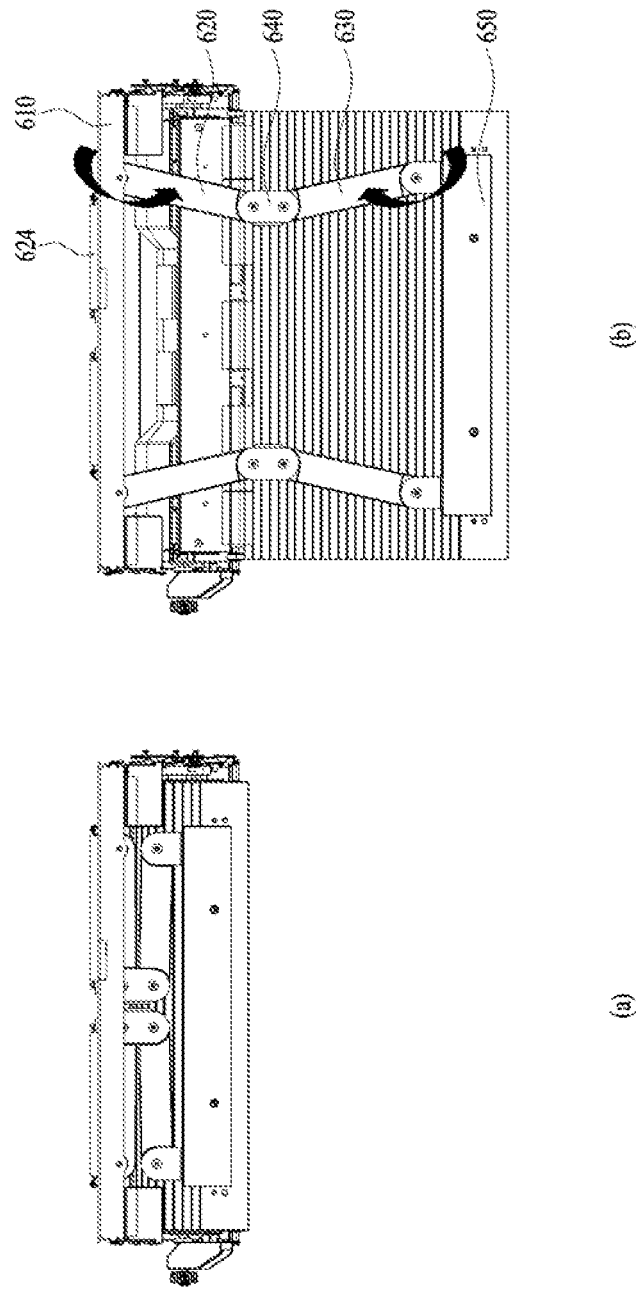
FIG. 10B illustrates a movement of a display support of a display device according to an embodiment of the present disclosure.

FIG. 10B shows a movement of the display support 600 of the display device 1000. (a) in FIG. 10B shows states of the first support arm 620 and the second support arm 630 in the first mode. (b) in FIG. 10B shows pivoting states of the first support arm 620 and the second support arm 630 in the fourth mode.

The more the display unit 100 is extended, the greater the angle between the first support arm 620 and the second support arm 630. Referring to (b) in FIG. 10B, while the display unit 100 is extended, the right first support arm 620 pivots counterclockwise and the right second support arm 630 pivots clockwise.

FIG. 11A shows internal components of the display device 1000. The display device 1000 may further include the rear protective cover 700, the rear cover winder 800, and/or the cover guide 900 to cover the rear surface of the display unit 100.

(a) in FIG. 11A shows the first mode, and (b) in FIG. 11A shows the fourth mode. The first mode is the state in which the display unit 100 is retracted into the casing, and the fourth mode is the state in which the display unit 100 is maximally extended.

Figure 11B:
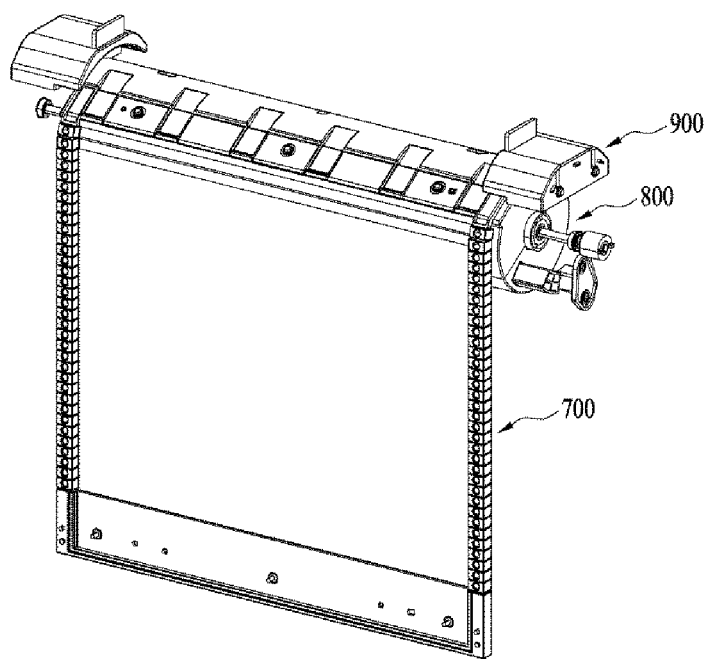
FIG. 11B shows components that are involved in protecting a rear surface of a display unit according to an embodiment of the present disclosure.

FIG. 11B shows components that are involved in protecting the rear surface of the display unit 100.

The rear protective cover 700, the rear cover winder 800, and the cover guide 900 are components related to a function of protecting or covering the rear surface of the display unit 100. The rear protective cover 700, the rear cover winder 800, and/or the cover guide 900 may be omitted from the display device 1000 based on a need of the user.

Figure 11C:
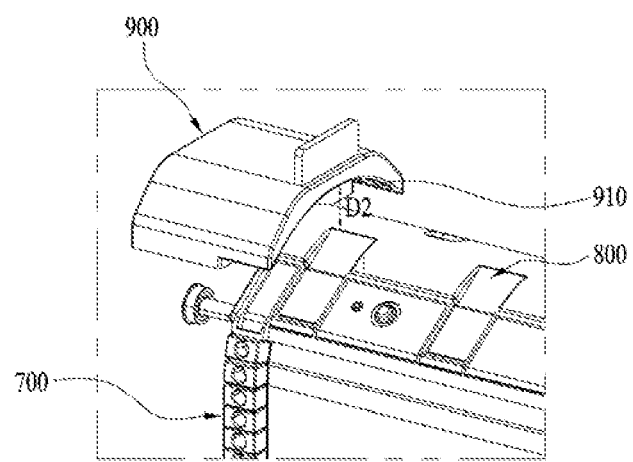
FIG. 11C illustrates a cover guide according to an embodiment of the present disclosure.
Figure 11D:
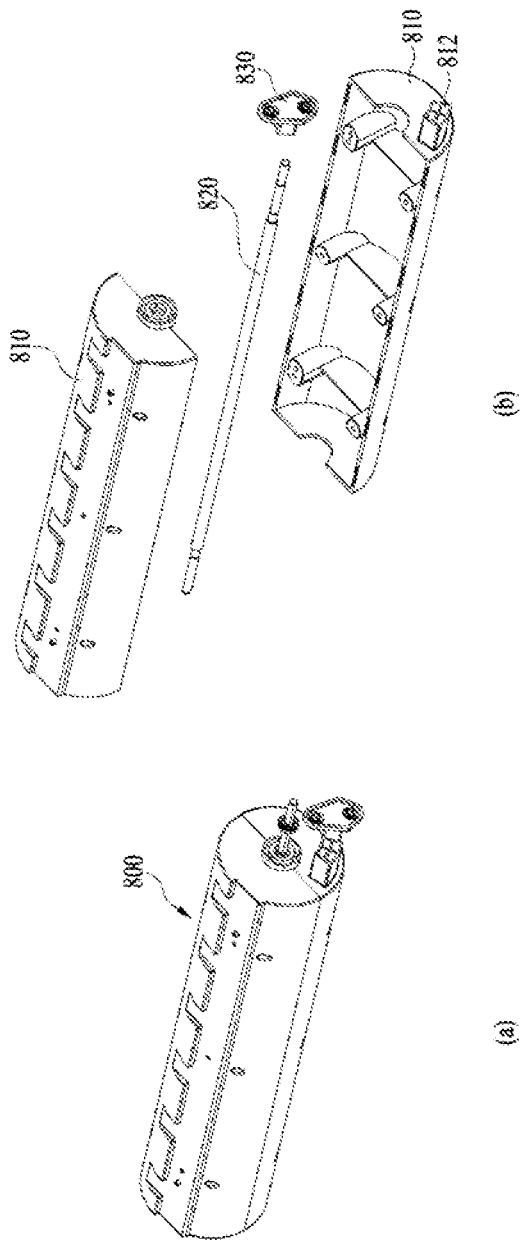
FIG. 11D shows a cover winding drum and an exploded view thereof according to an embodiment of the present disclosure.
Figure 11E:
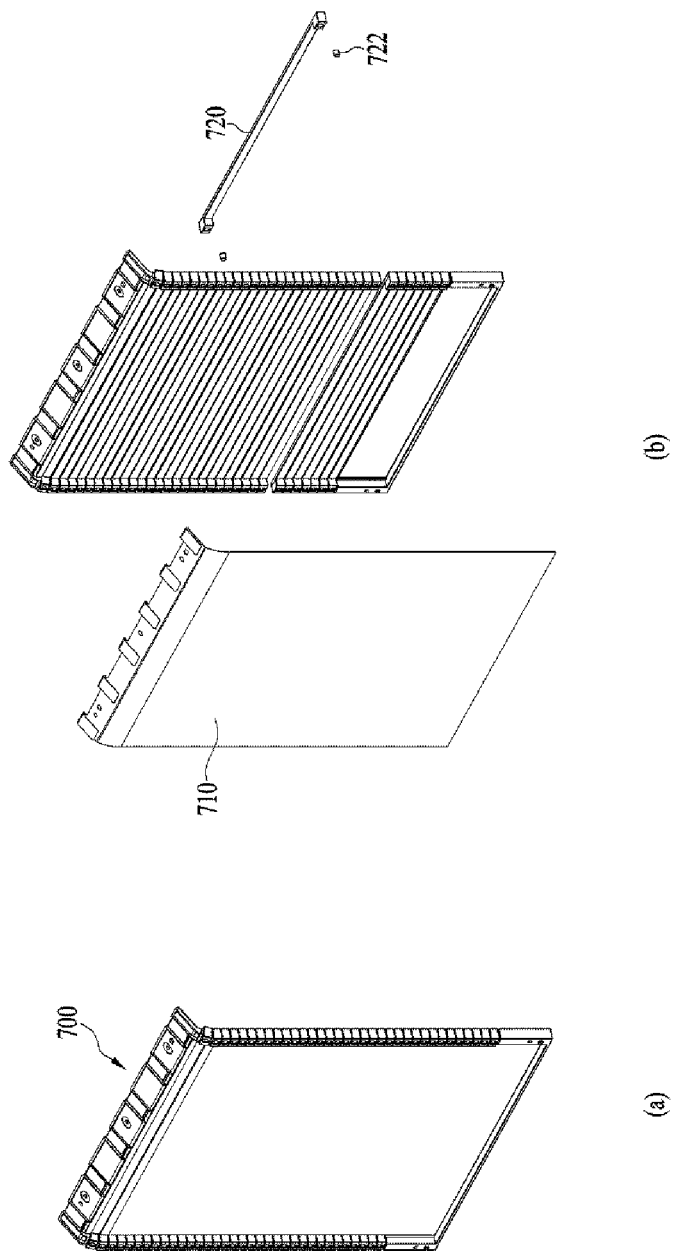
FIG. 11E shows a rear protective cover and an exploded view thereof according to an embodiment of the present disclosure.
Figure 13:
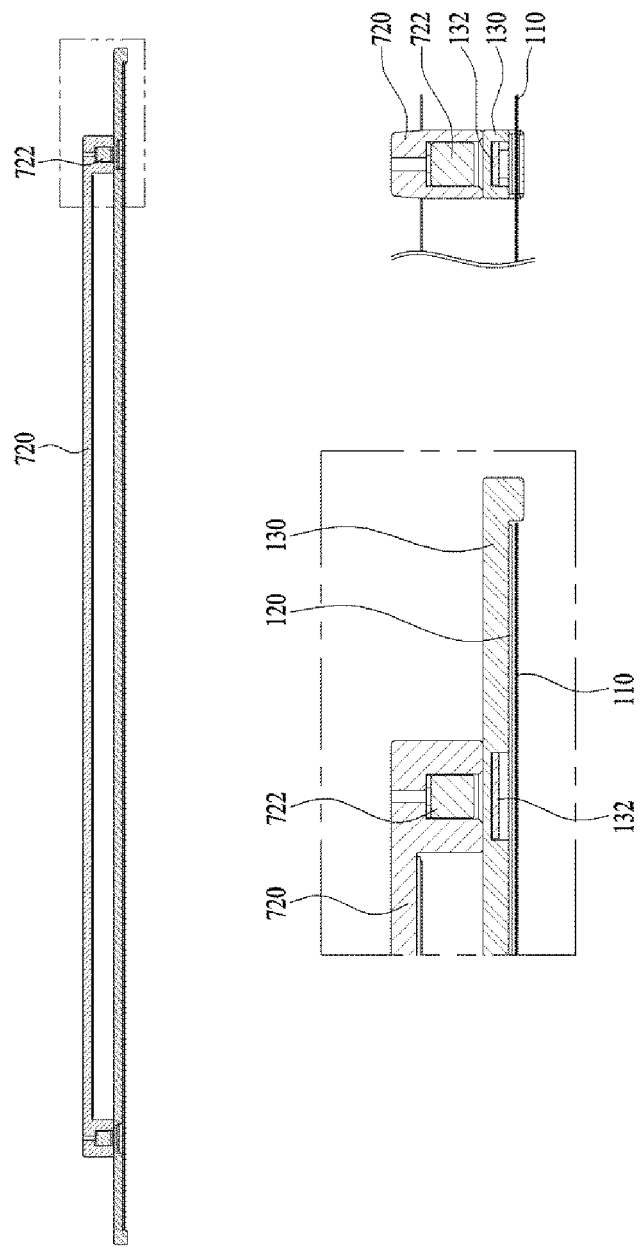
FIG. 13 shows detachable portions of a display cover and a protective cover according to an embodiment of the present disclosure.

FIG. 11C shows the cover guide 900. FIG. 11D shows a cover winding drum 810 of the rear cover winder 800 and an exploded view thereof. FIG. 11E shows the rear protective cover 700 and an exploded view thereof. FIG. 12 shows a protective cover 720 of the rear protective cover 700. FIG. 13 shows detachable portions of the display cover 130 and the protective cover 720.

The rear protective cover 700 covers the rear surface of the display unit 100 and the display support (the first support arm, the second support arm, and the like) 600 exposed to the outside, thereby protecting the components and improving aesthetics of the device.

The rear protective cover 700 is detachable from the rear surface of the display unit 100 and covers the rear surface of the display unit 100 extended out of the casing.

The rear protective cover 700 may be composed of the protective cover 720, an adhesive sheet 710, and/or a magnet 722.

The protective cover 720 is a cover that protects the exposed portion of the rear surface of the display unit 100 or the display support 600. The protective cover 720 may be formed in a shape that is longer in the horizontal direction than in the vertical direction. A plurality of protective covers 720 are attached to one surface of the adhesive sheet 710 by an adhesive means. The adhesive means includes a double-sided tape such as the FOAM tape. A width of the protective cover 720 may be equal to or smaller than a width of the display unit 100. A height of the protective cover 720 may be designed appropriately by a person skilled in the art so as to flexibly respond to the curving of the display. The adhesive sheet 710 may be made of a flexible material, and the rear protective cover 700 may be wound via the rear cover winder 800. Materials of the adhesive sheet 710 may include polyethylene terephthalate (PET).

The protective cover 720 may further include the magnets 722 at both ends in the horizontal direction thereof. The magnet 722 is used for attachment or detachment to or from the display unit 100. The display cover 130 of the display unit 100 has the magnets 132 at both left and right ends thereof, so that the magnet 132 of the display cover 130 and the magnet 722 of the protective cover 720 may be detached from each other.

The display cover 130 of the display unit 100 and the protective cover 720 have the respective magnets at locations corresponding to each other. The protective cover 720 is removed from the display cover 130 when the display unit 100 is retracted into the casing, and is magnetically attached to the display cover 130 when the display unit 100 is extended from the casing. As shown in FIG. 13, the magnets 722 are disposed at both left and right ends of the protective cover 720, and locations thereof correspond to the locations of the magnets 132 disposed on the display cover 130.

The rear protective cover 700 may be detachable from the rear surface of the display unit 100 and may cover the exposed rear surface of the display unit 100. Each of the display unit 100 and the rear protective cover 700 may have the plurality of magnets, and the magnet of the display unit 100 and the magnet of the rear protective cover 700 may be located at locations corresponding to each other in the vertical direction. The rear protective cover 700 may be detached from the display unit 100 by the magnets.

A lowermost end of the display unit 100 and a lowermost end of the rear protective cover 700 are connected to each other in a fixed manner. Therefore, when the display unit 100 is wound around the display winder 300, the rear protective cover 700 also ascends along with the display unit 100. The rear protective cover 700 is removed from the display unit 100 inside the casing and wound around the rear cover winder 800. The lowermost end of the rear protective cover 700 may be fixed to and not be removed from the lowermost end of the rear surface of the display unit 100.

Materials of the protective cover 720 may include polycarbonate (PC) or aluminum.

The rear cover winder 800 includes the cover winding drum 810 for winding the rear protective cover 700.

The cover winding drum 810 may wind the rear protective cover 700 thereon by rotating around a rotation shaft 820. The rotation shaft 820 of the cover winding drum 810 may be oriented in the horizontal direction inside the casing, and the cover winding drum 810 may rotate around the rotation shaft 820 to wind the rear protective cover 700 thereon. The cover winding drum 810 has a cylindrical shape.

Referring to FIG. 11A, the cover winding drum 810 is disposed parallel to the rotary drum 310, and the display unit 100 and the rear protective cover 700 are detached from each other in a space between the cover winding drum 810 and the rotary drum 310. In FIG. 11A, when the rotary drum 310 rotates clockwise, the cover winding drum 810 rotates counterclockwise. The display unit 100 moves through the space between the rotary drum 310 and the cover winding drum 810.

Referring to FIG. 11D, the cover winding drum 810 may further include a rotation stopper 812 protruding from one side surface thereof. The rotation stopper 812 rotates along with the rotation of the cover winding drum 810. In addition, the display device may further include a fixed stopper 830 fixed on a movement path of the rotation stopper 812 of the cover winding drum 810. The fixed stopper 830 is fixed on the movement path of the rotation stopper 812 to prevent excessive rotation of the cover winding drum 810. Accordingly, the cover winding drum 810 rotates only until the rotation stopper 812 comes into contact with the fixed stopper 830. The fixed stopper 830 may be fixed in location at the frame or the like located inside the casing.

The cover guide 900 guides the movement of the rear protective cover 700. Referring to FIG. 11C, the cover guide 900 may be positioned at a predetermined distance D2 from an outer circumferential surface of the cover winding drum 810. The movement of the rear protective cover 700 is guided through a space between the outer circumferential surface of the cover winding drum 810 and the cover guide 900. The distance D2 from the outer circumferential surface of the cover winding drum 810 to the cover guide 900 is equal to or greater than a thickness of the rear protective cover 700. The cover guide 900 may include a plurality of cover guides that respectively guide a left portion and a right portion of the rear protective cover 700. The cover guide 900 has a concave curved surface 910, and a curvature of the curved surface 910 corresponds to a radius of the cover winding drum 810+D2. Materials of the cover guide 900 may include acrylonitrile butadiene styrene (ABS).

The cover guide 900 is illustrated as an integrated guide, but a roller-type guide scheme may be applied. That is, the rear protective cover 700 may be guided by a rod oriented in the horizontal direction and a plurality of rollers connected to the corresponding rod.

The rear protective cover 700, the rear cover winder 800, and/or the cover guide 900 have a structure that may be removed from the display device 1000, so that whether to apply the corresponding components may be determined based on the user's selection.

FIG. 14 shows a state in each mode of the display device 1000.

The first mode, as the state in which the display unit 100 is retracted into the casing, is the state in which the rotary drum 310 winds the display unit 100 as much as possible. When the second mode is executed by the user's selection, the display driver 200 may operate the motor 210 to rotate the rotary drum 310 and extend the display unit 100 out of the casing.

When the display unit 100 is extended to the degree corresponding to the second mode, the sensor assembly 500 may recognize that the second mode is activated. That is, the sensing state of one specific sensor representing the second mode among the plurality of sensors 510 and the sensing state of the other sensors become different from each other. That is, the hole 522 of the sensed portion 520 may be located in the recognition area of the specific sensor 510 representing the second mode. The display device 1000 may recognize the second mode and stop the motor 210.

In the case of the third mode, the display unit 100 is extended more than in the second mode. When the third mode is executed by the user's selection, the display driver 200 operates the motor 210 to further extend the display unit 100. When the sensor assembly 500 recognizes that the third mode is activated, the motor 210 stops.

In the same way, the display device 1000 may differently control the degree of extension of the display unit 100 based on the various modes. The modes may be classified into the four, with the state in which the display unit 100 is completely retracted into the casing as the first mode and the state in which the display unit 100 is completely extended as the fourth mode. Each mode may be distinguished based on the type and the function of information displayed on the display 110. For example, the third mode may be used on the navigation screen, and the fourth mode may be used when the video or the game is executed.

In one example, a method for controlling a display device according to embodiments includes receiving, by the display device, a selected mode signal from the user, driving the motor in response to the received signal, identifying, by the sensor assembly 500, an extension mode of the display unit 100, and/or stopping the motor.

The user may select the several modes in relation to the display device. For example, when the user selects a navigation mode, the navigation mode may correspond to the third mode. The display device may receive a corresponding mode signal and drive the motor in response thereto. In each operation, the reception of the mode signal, the driving of the motor, and stop control may be performed by the controller (not shown). As the display unit 100 moves, the sensor assembly 500 may determine whether the display unit 100 is at a location corresponding to the received mode signal. When it is identified that the display unit 100 is at the location corresponding to the received mode signal, the controller of the display device may receive information on the state of the display unit 100 from the sensor assembly 500 and stop driving the motor.

With the above-described operation (method), the display device 1000 may increase efficiency of the display device by efficiently changing the display extension mode of the display device based on the user's selection.

In addition, according to the embodiments of the present disclosure, as the flexible display is retracted into or extended out of the casing in the scheme of being wound, a volume of the device required for accommodating the display may be reduced. In addition, the exposure range of the display may be controlled and effectiveness of the display device may be improved by the sensor recognition method appropriately applied to the scheme of winding the display. As the exposure range of the display is controlled, the visual information may be output only on the exposed area of the screen, and the power consumption resulted from use of the display may be reduced.

The display device according to the embodiments may be applied to various locations such as a center, a passenger display, a center console display, a rear seat entertainment display, a rear center display, and a rear control display of the vehicle.

It is understood that the description of the various embodiments of the present disclosure is not limited only to the corresponding embodiments, and the technical idea applied in the various embodiments may also be applied to other embodiments.

As described above, the detailed description of the preferred embodiments of the present disclosure is provided such that those skilled in the art may implement and practice the present disclosure. Although the description has been made above with reference to the preferred embodiments of the present disclosure, those skilled in the art will understand that the present disclosure may be modified and changed in various ways within a range that does not deviate from the scope of the present disclosure. For example, those skilled in the art may use the components described in the above-described embodiments in a way of combining them together.

Accordingly, the present disclosure is not intended to be limited to the embodiments described herein, but is intended to be accorded the widest scope consistent with the principles and novel features disclosed herein.

What is claimed is:

1. A display device comprising:
   a casing with an opening defined in a lower surface thereof;

a display unit configured to be retracted into and extended out of the casing via the opening;
a display driver for moving the display unit; and
a display winder for winding the display unit thereon based on the movement of the display unit;
wherein the display unit comprises a flexible display and a rear protective cover to protect a rear surface of the flexible display;
wherein the display winder comprises a rotary drum on which the flexibly display is selectively wound and unwound by the display driver and a separate rear cover winder on which the rear protective cover is selectively wound and unwound by the display driver; and
wherein a portion of the rotary drum on which the flexible display rests when wound comprises a central section in between two end sections, wherein the central section has a cross section smaller than a cross section of the two end sections such that the flexible display rests on and contacts the two end sections when wound without additional contact at the central section.

2. The display device of claim 1, wherein the rear protective cover of the display unit includes:
a plurality of elongated cover members arranged across a width of the flexible display.

3. The display device of claim 2, wherein each of the elongated cover members comprises a magnet to adhere to the flexible display.

4. The display device of claim 3, wherein each of the elongated cover members comprises two magnets, one disposed at each end of the elongated cover member corresponding to magnetic elements on the flexible display.

5. The display device of claim 1, further comprising a support bar biased to cover the opening in the casing when the display unit is retracted into the casing.

6. The display device of claim 5, wherein the support bar is configured to pivot when the display unit is extended from the base, and end of the support bar remaining in contact with a rear surface of the display unit to support the display unit when extended.

7. The display device of claim 1, wherein the display driver includes:
a worm gear assembly connected to the motor and having a rotation shaft parallel to the motor; and
a worm wheel assembly connected to the worm gear assembly and having a rotation shaft perpendicular to the motor,
wherein the rotation shaft of the worm wheel assembly is also the rotation shaft of the rotary drum to move the display unit with rotation of the motor.

8. The display device of claim 6, wherein a display support includes a first support arm having a first end pivotably connected to an upper point inside the casing and a second end connected to a rear surface of the display unit, and wherein the first support arm pivots in a plane parallel to a screen of the display unit, the first support arm comprising two sections connected by an arm joint, the two sections pivoting at the arm joint as the display unit is extended and retracted.

9. The display device of claim 8, wherein the display support includes a second support arm connected at respective ends to the casing and rear surface of the display unit, the second support arm also comprising two sections connected by an arm joint, the two sections pivoting at the arm joint as the display unit is extended and retracted.

10. The display device of claim 8, wherein the first support arm has a protrusion protruding from the first end thereof,
wherein a spring is connected to the protrusion, and
wherein the spring applies a force to the protrusion to pivot the two sections at the arm joint of the first support arm such that the first support arm extends lengthwise in an extension direction of the display unit to extend the display unit.

11. The display device of claim 1, further comprising a sensor assembly for sensing a rotation state of a rotary drum of the display winder.

12. The display device of claim 11, wherein the sensor assembly includes:
a plurality of stationary sensors; and
a sensed portion of the rotary drum capable of being sensed by the plurality of sensors,
wherein the sensed portion is connected to a side surface of the rotary drum, and
wherein one of the plurality of sensors recognizes a different state than a state recognized by other sensors of the plurality of sensors, the different state sensed based on the rotation state of the rotary drum.

13. The display device of claim 12, wherein an extension range of the display unit is controlled based on the rotation state of the rotary drum recognized by the sensor assembly.

14. The display device of claim 12, wherein the display driver controls operation of a motor based on the rotation state of the rotary drum recognized by the sensor assembly,
wherein the sensed portion has a hole formed therein, and
wherein the hole passes through recognition areas of the plurality of sensors based on the rotation state of the rotary drum.

15. The display device of claim 1, further comprising:
a Printed Circuit Board (PCB) electrically connected to the flexible display; and
a protective cover for covering the PCB to protect the PCB during movement of the flexible display.

* * * * *